United States Patent
Mast et al.

(10) Patent No.: US 12,179,140 B2
(45) Date of Patent: *Dec. 31, 2024

(54) EXHAUST GAS PURIFICATION SYSTEM AND METHOD AND DATA PROCESSING SYSTEM FOR MONITORING AT LEAST ONE EXHAUST GAS PURIFICATION SYSTEM

(71) Applicant: Dürr Systems AG, Bietigheim-Bissingen (DE)

(72) Inventors: Lars Mast, Kornwestheim (DE); Sven Meyer, Sachsenheim (DE); Lars Ebinger, Bietigheim-Bissingen (DE); Gerhard Grunwald, Bretten (DE); Nathan Schubring, Oconto, WI (US); Andreas Keil, Munich (DE); Jeffrey Quass, Greeny Bay, WI (US)

(73) Assignee: Dürr Systems AG

( * ) Notice: Subject to any disclaimer, the term of this patent is extended or adjusted under 35 U.S.C. 154(b) by 488 days.

This patent is subject to a terminal disclaimer.

(21) Appl. No.: 17/293,084

(22) PCT Filed: Nov. 14, 2019

(86) PCT No.: PCT/US2019/061351
§ 371 (c)(1),
(2) Date: May 12, 2021

(87) PCT Pub. No.: WO2020/102467
PCT Pub. Date: May 22, 2020

(65) Prior Publication Data
US 2021/0394116 A1  Dec. 23, 2021

(30) Foreign Application Priority Data
Nov. 15, 2018  (DE) .......................... 102018128739.9

(51) Int. Cl.
*B01D 53/00* (2006.01)
*B01D 46/00* (2022.01)
(Continued)

(52) U.S. Cl.
CPC ....... *B01D 53/002* (2013.01); *B01D 46/0086* (2013.01); *B01D 53/06* (2013.01);
(Continued)

(58) Field of Classification Search
None
See application file for complete search history.

(56) References Cited

U.S. PATENT DOCUMENTS

| | | | |
|---|---|---|---|
| 11,130,091 B2 * | 9/2021 | Schubring ............ | B01D 5/0027 |
| 11,731,073 B2 * | 8/2023 | Schubring ............ | B01D 5/0027 96/145 |

(Continued)

FOREIGN PATENT DOCUMENTS

| | | | | |
|---|---|---|---|---|
| CN | 104 765 341 A | | 7/2015 | |
| CN | 108513634 A | * | 9/2018 | ............... F23G 7/06 |

(Continued)

OTHER PUBLICATIONS

CN108513634A_ENG (Espacenet machine translation of Zheng) (Year: 2018).*

(Continued)

*Primary Examiner* — Gabriel E Gitman
(74) *Attorney, Agent, or Firm* — 2SPL Patent Attorneys PartG mbB; Kieran O'Leary

(57) ABSTRACT

The present invention relates to a computer-implemented method for monitoring at least one exhaust gas purification system for purifying an exhaust gas stream to be purified of an industrial system or an industrial process. The method comprises retrieving system data of the exhaust gas purification system from a data cloud. The system data stored in (Continued)

the data cloud were at least partially received beforehand by the data cloud from the exhaust gas purification system. The system data relate to at least measurement data of at least one sensor of the exhaust gas purification system and/or data about at least one adjustable parameter of the exhaust gas purification system. The method further comprises determining at least one quantity characterizing the exhaust gas purification system based on the retrieved system data.

4 Claims, 23 Drawing Sheets

(51) Int. Cl.
*B01D 53/06* (2006.01)
*B01D 53/30* (2006.01)
*F25J 1/00* (2006.01)
*G05B 19/042* (2006.01)
*G05B 19/418* (2006.01)
*H04L 67/12* (2022.01)

(52) U.S. Cl.
CPC ............ *B01D 53/30* (2013.01); *F25J 1/0052* (2013.01); *G05B 19/042* (2013.01); *H04L 67/12* (2013.01); *B01D 2253/108* (2013.01); *B01D 2257/504* (2013.01); *B01D 2257/704* (2013.01); *B01D 2257/708* (2013.01); *B01D 2258/0258* (2013.01); *B01D 2259/40088* (2013.01); *G05B 19/41875* (2013.01); *G05B 2219/25274* (2013.01)

(56) References Cited

U.S. PATENT DOCUMENTS

| | | |
|---|---|---|
| 2005/0238549 A1 | 10/2005 | Hammel |
| 2009/0145126 A1 | 6/2009 | Chillar et al. |
| 2014/0200840 A1 | 7/2014 | Cox et al. |
| 2015/0231565 A1 | 8/2015 | Wittrock et al. |
| 2016/0290977 A1 | 10/2016 | Cogill et al. |
| 2017/0130635 A1 | 5/2017 | Smith et al. |
| 2017/0364043 A1 | 12/2017 | Ganti et al. |
| 2018/0148389 A1 | 5/2018 | Wang |
| 2018/0163604 A1 | 6/2018 | Wang et al. |
| 2018/0238217 A1 | 8/2018 | Devito et al. |
| 2018/0311609 A1* | 11/2018 | McCool ............... G05B 19/401 |

FOREIGN PATENT DOCUMENTS

| | | |
|---|---|---|
| DE | 197 39 848 A1 | 3/1999 |
| DE | 10 2006 002 645 A1 | 10/2006 |
| DE | 10 2008 037 604 A1 | 6/2009 |
| DE | 10 2015 117 530 A1 | 5/2016 |
| DE | 10 2016 121 297 A1 | 5/2017 |
| WO | 2008/085817 A1 | 7/2008 |
| WO | 2017/129208 A1 | 8/2017 |
| WO | 2017/136336 A1 | 8/2017 |

OTHER PUBLICATIONS

C.C. Hiers: U.S. Pat. No. 589,125, patented Aug. 31, 1897 (added to the Non-Patent Literature section because the No. could not be entered into above section "U.S. Patents" for technical reasons).
Khan et al., „Removal of Volatile Organic Compounds from Polluted Air, Journal of Loss Prevention in the Process Industries, vol. 13, No. 6, pp. 527-545, Nov. 1, 2000.
VOC Emission Control, Manual of Voluntary Measures Regarding Industrial Clean-ing, Asahi Research Center Co., Ltd., Mar. 2007.
Tombo Brand SolventClean, Nichias Corporation, 12 pages, published prior to Jul. 11, 2019.
Sky-Save VOC Concentrator, Seibugiken Products, 6 pages, published prior to Jul. 11, 2019.

* cited by examiner

FIG. 2

| FIG. 2-1 | FIG. 2-2 |
|---|---|
| FIG. 2-3 | FIG. 2-4 |

⚠ Alarms  ⊲ Location  ☐ Dashboard Tread Test

EVENT LIST
From ☐ To ☐ T

○ Automatic update ⟲

- 28. August 2018 14:45 — Heat-up process ○ RTKS_Technikum ›
- 28. August 2018 14:33 — System start ○ RTKS_Technikum ›
- 28. August 2018 14:12 — Machine switched-off ○ RTKS_Technikum ›
- 28. August 2018 13:51 — Machine switched-off ○ RTKS_Technikum ›
- 27. August 2018 19:08 — Machine switched-off ○ RTKS_Technikum ›
- 27. August 2018 18:54 — Machine switched-off ○ RTKS_Technikum ›
- 27. August 2018 17:04 — System start ○ RTKS_Technikum ›
- 27. August 2018 17:00 — Machine switched-off ○ RTKS_Technikum ›
- 27. August 2018 — Machine switched-off ○ RTKS_Technikum ›

RAW GAS KA163 T05  21.7535 C

PURIFIED GAS AT192 T05  22.0544 C

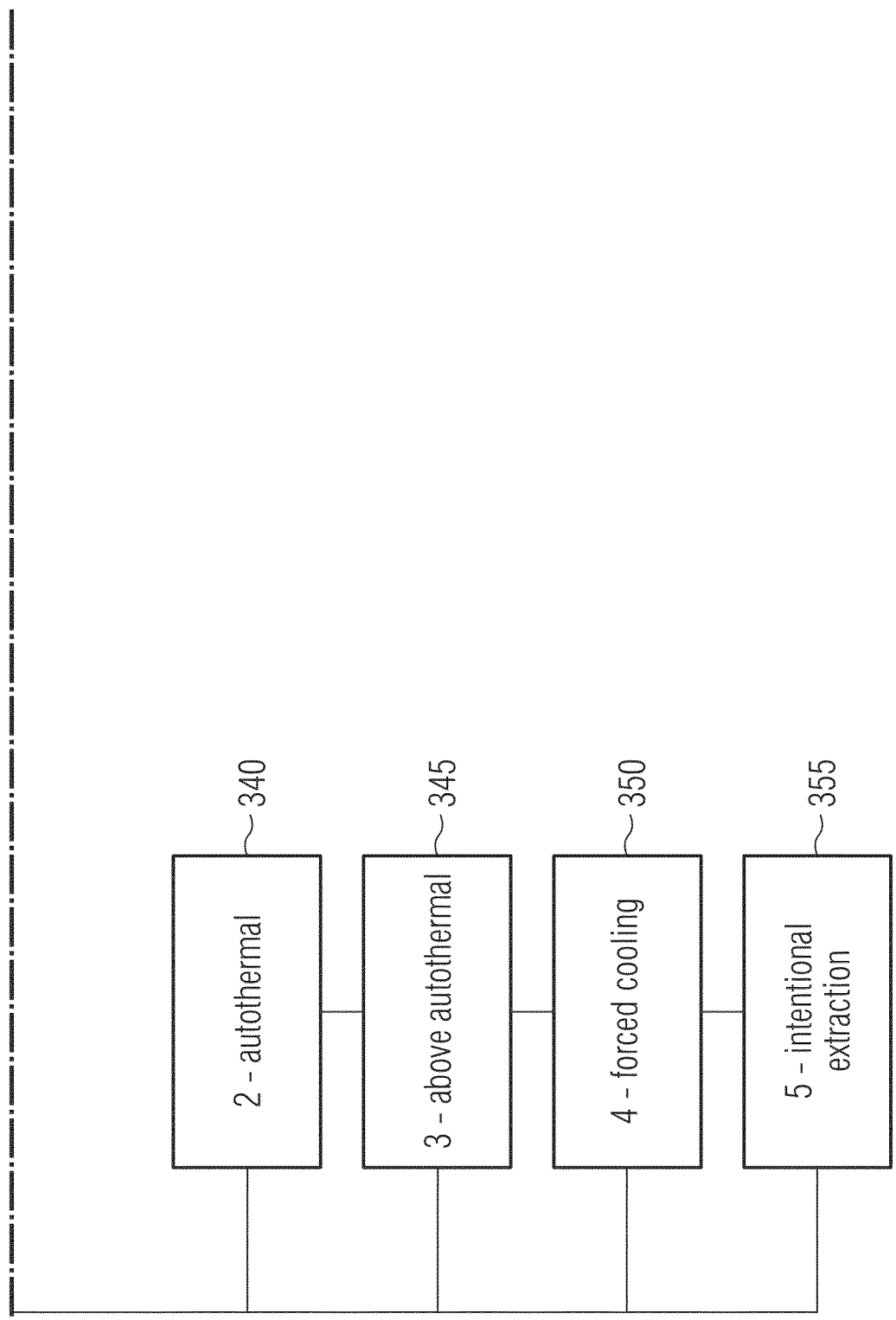

EXHAUST GAS PURIFICATION SYSTEM AND METHOD AND DATA PROCESSING SYSTEM FOR MONITORING AT LEAST ONE EXHAUST GAS PURIFICATION SYSTEM

CROSS-REFERENCE TO RELATED APPLICATIONS

This application is a 35 U.S.C. § 371 (c) national stage entry of PCT/US2019/061351, filed on Nov. 14, 2019. That application claimed priority to German Application 10 2018 128 739.9 filed on Nov. 15, 2018 and U.S. application Ser. No. 16/508,482, filed on Jul. 11, 2019. The contents of the earlier filed applications are incorporated by reference herein in their entirety.

FIELD

The present invention relates to monitoring of exhaust gas purification systems. In particular, the present invention relates to a computer-implemented method and a data processing system for monitoring at least one exhaust gas purification system and to an exhaust gas purification system itself.

BACKGROUND

Exhaust gas purification systems are used for purifying an exhaust gas stream or an exhaust air stream. During operation of an exhaust gas purification system, a variety of data points are collected or generated by the exhaust gas purification system itself. These data points are analyzed or evaluated in order to enable a monitoring or characterizing of the exhaust gas purification system. For this purpose, the data are conventionally stored on a local storage medium (e.g. memory card, portable hard disk or USB stick) coupled to the exhaust gas purification system and then evaluated manually by qualified personnel. For example, recorded measurement data can be visualized by qualified personnel by means of special software, or quantities of interest can be calculated or estimated by means of partly extensive calculations.

The legacy evaluation of the data points generated by the exhaust gas purification system substantially limits the determination of the state of the system to the current and/or past state. Likewise, the evaluation of the data points is only possible with appropriate specialist knowledge and at a considerable expenditure of time. Also, the data points are usually only available locally at the system, so that a direct access to the system is required for the evaluating qualified personnel.

In view of the above, one object of the present invention is to provide an improved possibility for monitoring exhaust gas purification systems.

SUMMARY

The object of the invention is solved by a computer-implemented method and a data processing system for monitoring at least one exhaust gas purification system as well as an exhaust gas purification system according to the independent claims. Further aspects as well as further developments of the invention are described in the dependent claims, the following description and in the figures.

According to a first aspect, the invention relates to a computer-implemented method for monitoring at least one exhaust gas purification system. An exhaust gas purification system is a system that removes impurities or one or more pollutants from a fed (supplied, received) exhaust gas stream or exhaust air stream so that a purified (cleaned) exhaust gas stream can be transmitted from (emitted/released by) the exhaust gas purification system. The purified exhaust gas that is transmitted from the exhaust gas purification system is often also referred to as purified (clean) gas. The exhaust gas stream or exhaust air stream to be purified, which is fed into the exhaust gas purification system, can originate from an industrial system or an industrial process of the chemical, petrochemical, pharmaceutical or solvent processing industries, for example. A pollutant can be understood in this context as a substance that harms systems, animals, humans and/or the environment when occurring in a specific quantity or concentration (e.g. defined as mass of the pollutant per unit volume of the exhaust gas stream or as number of pollutant particles per unit volume of the exhaust gas stream). Accordingly, the purification of the exhaust gas stream or exhaust air stream may include, e.g., a detoxification, denitrification, deacidification, desulfurization, dedusting or a combination thereof. For example, organic and/or inorganic pollutants can be removed from the exhaust gas stream or exhaust air stream by the exhaust gas purification system. An exhaust gas purification system can be used for removing, e.g., solvents, nitrogen oxides ($NO_x$), sulfur oxides ($SO_x$), hydrogen fluoride (HF), ammonia ($NH_3$), hydrogen chloride (HCl), dioxins, furans or pollutants of the basic structure $C_xH_yO_z$ (C denotes carbon; H denotes hydrogen; O denotes oxygen; x, y, and z are natural numbers) from the exhaust gas stream or exhaust air stream.

The exhaust gas purification system may use various methods to purify the exhaust gas stream or exhaust air stream. For example, the exhaust gas purification system may use known concentration methods/processes (e.g., by means of absorption, adsorption or membranes), condensation methods, catalytic methods, non-catalytic-chemical methods, methods using a nonthermal plasma (cold oxidation), biological methods (e.g., bioscrubbers, biofilters), mechanical methods, electromechanical methods, thermal methods or a combination of several of the above-mentioned methods. Concentration methods may be used in combination with another method or process, in particular methods for exhaust gas purification. For example, concentration methods may be used together with a condensation method/process (e.g. for solvent recovery) and/or an oxidative method/process for pollutant conversion (e.g. thermal or catalytic oxidation for pollutant disposal). An exhaust gas purification system using a catalytic method may, for example, comprise monolithic catalyst elements and/or catalytically activated filter elements (e.g., ceramic filter cartridges or fabric filters) for purifying the exhaust gas stream or exhaust air stream. An exhaust gas purification system using a thermal method may purify the exhaust gas stream or exhaust air stream, e.g., via recuperative thermal oxidation (Germ. TNV=thermische Nachverbrennung), regenerative thermal oxidation (RTO), direct-fired thermal oxidation with subsequent waste heat utilization or by substituting the oxidation air of a process heat generation facility with the exhaust gas stream or exhaust air stream. Alternatively or in addition, the exhaust gas purification system may also use separation processes in cyclone separators, filtering devices, electrostatic precipitators and/or scrubbers for (further) exhaust gas purification.

The inventive method comprises retrieving of system data of the exhaust gas purification system from a data cloud (e.g. comprising cloud storage and cloud computing). A data cloud denotes the provision of IT infrastructure, such as memory space, computing power or application software as hosted services over the Internet and/or at least an intranet. According to embodiments, the data cloud may in this context also be built up from several instances of (sub-) data clouds or comprise several instances of (sub-) data clouds. For example, the data cloud may include an intranet data cloud at the location of the exhaust gas purification system or a cross-site intranet data cloud of an operator of the exhaust gas purification system as well as a further data cloud on the Internet (into which, for example, a manufacturer of the exhaust gas purification system may also enter data).

The system data stored in the data cloud were at least partially received beforehand by the data cloud from the exhaust gas purification system. For example, the exhaust gas purification system may transmit the system data continuously, periodically (e.g. hourly or daily) or in an event-triggered manner via the Internet to the data cloud. In some embodiments, subsets of the system data may have been, for example, entered manually into the data cloud by an operator or manufacturer of the exhaust gas purification system. Likewise, subsets of the system data may also have been received by the data cloud from other systems (e.g., exhaust gas purification system(s) similar or identical to the monitored exhaust gas purification system;

industrial systems and/or further exhaust gas purification systems coupled to the monitored exhaust gas purification system).

The system data relate to at least measurement data of at least one sensor of the exhaust gas purification system and/or data about at least one adjustable parameter of the exhaust gas purification system. The system data may in general include all data recorded by the exhaust gas purification system or data derived from the recorded data by the exhaust gas purification system. Likewise, the system data may include, for example, measurement data of at least one sensor of the industrial system(s), the exhaust gas or exhaust air of which is purified by the exhaust gas purification system. Measurement data from sensors of the industrial system(s) are sometimes forwarded at least in part to the connected exhaust gas purification systems so that these are also present at the exhaust gas purification system and can be understood as data recorded by the exhaust gas purification system. For example, the system data relating to the measurement data of the at least one sensor may be the actual measurement data of the sensor or data derived therefrom by the exhaust gas purification system. Accordingly, the system data relating to the at least one adjustable parameter of the exhaust gas purification system may be, e.g., a value of the adjustable parameter or data derived therefrom by the exhaust gas purification system. In some embodiments, the system data stored in the data cloud may be identical to the data received from the exhaust gas purification system. In other words: in some embodiments, the system data in the data cloud are not further processed before they are fed into the inventive method. In alternative embodiments, the data received from the exhaust gas purification system may also be modified by the data cloud before being stored. For example, the data format of received system data may be changed before being stored. In order to save memory space, data received continuously by the data cloud (e.g., a parameter of the exhaust gas purification system) may only be stored if the data change (e.g., parameters of the exhaust gas purification system change), or only information relating to the change of the data may be stored (e.g., the value by which a parameter of the exhaust gas purification system has changed), for example.

Furthermore, the system data may also include supplementary data from other sources (see examples above). For example, the supplementary data may be data characterizing the exhaust gas purification system, data from an operating history of the exhaust gas purification system, data from identical or similar exhaust gas purification systems—in particular also data on or about their operating history and/or operating states, data from systems in the same emission line (e.g., for a cascade of various exhaust gas purification systems at the end of at least one production process), etc.

In other words: the system data of the exhaust gas purification system stored in the data cloud may include unprocessed raw data of the exhaust gas purification system, data pre-processed by the exhaust gas purification system, supplementary data from further sources or a combination thereof.

The type as well as the number of the quantities measured at the exhaust gas purification system may vary depending on the type of exhaust gas purification system. For example, other quantities can be measured at an exhaust gas purification system that operates according to the TNV principle than at an exhaust gas purification system that uses electro-mechanical and/or concentration and/or adsorption-desorption and/or condensation methods for exhaust gas purification. Some possible measures are listed below, wherein it must be considered that these are chosen merely as examples and that other and/or further (physical) quantities may also be measured at the exhaust gas purification system according to embodiments of the invention.

A sensor of the exhaust gas purification system can, for example, measure a temperature such as a temperature of a combustion chamber or an exhaust gas stream or exhaust air stream. It is also possible to measure, for example, a position of a flap of the exhaust gas purification system. For example, an open or closed position or a relative opening angle of the flap may be measured binarily. Likewise, for example, a volume flow of an exhaust gas stream or exhaust air stream, a pressure of an exhaust gas stream or exhaust air stream or an instantaneous frequency of a frequency converter of a fan driving an exhaust gas stream or exhaust air stream may be measured. Likewise, one or more mass flows may be measured at the system. For example, the mass flow of the natural gas used for oxidation may be measured via a gas meter. In some embodiments, a mass flow of compressed air or also the mass flow of a heat transfer medium (e.g. water, pressurized water, thermal oil or molten salt) may be measured, for example. Likewise, concentrations of one or more substances may be measured, for example. The concentration measurement can, for example, be carried out directly by means of a flame ionization detector or via an explosimeter measuring a concentration of potentially explosive gases. For example, the concentration of carbon dioxide ($CO_2$) in an exhaust gas stream to be purified and/or a purified exhaust gas stream may be measured. In some embodiments, the specific calorific value of a solvent contained in an exhaust gas stream to be purified can also be measured, for example. In exhaust gas purification systems using filter methods, for example, particle numbers can be measured in an exhaust gas stream to be purified and/or a purified exhaust gas stream. Likewise, on/off information describing the on or off state of an element of the exhaust gas purification system may be measured. For example, it may be measured at an exhaust gas purification system working according to the RTO principle, whether natural gas is injected into the combustion chamber or not. On/off information can, for example, be collected or stored as digital values or binary values (e.g., 0/1) in order to save memory space.

Likewise, the data about the at least one adjustable parameter of the exhaust gas purification system may vary depending on the type of exhaust gas purification system. For example, the data about the at least one adjustable parameter of the exhaust gas purification system may include information about an operation mode in which the exhaust gas purification system is operated at the moment or was operated in the past. The data about the at least one adjustable parameter of the exhaust gas purification system can also include, for example, target positions for a flap of the exhaust gas purification system, target temperatures in a combustion chamber of the exhaust gas purification system, target temperatures of an (e.g., purified) exhaust gas stream or exhaust air stream, target volume flows of an (e.g., purified) exhaust gas stream or exhaust air stream or also deviations of an actual value from a target value of the adjustable parameter. The examples recited above for the adjustable parameter of an exhaust gas purification system are again chosen merely as examples. Other and/or further adjustable parameters of the exhaust gas purification system may also be recorded according to embodiments of the invention. Alternatively or additionally, the data about the at least one adjustable parameter of the exhaust gas purification system may include information about the composition of the intermixed, diluted, evaporated, gaseous, and/or condensed solvent/-s (for example measurement data about the presence of water, organic species or other contaminants such as dissolved inorganics) taken, determined, and/or computed at and/or for at least one of a variety of process stages or positions within the plant while entering, passing, and/or leaving the exhaust gas purification system. Suitable measurement devices or sensors for acquiring these pieces of information may include Fourier-Transform Infrared Spectroscopy (FTIR), mass spectroscopy, electrical conductivity, pH-meter, RedOx-potential meters or other suitable instruments. Such analysis can improve the effectiveness of solvent recovery in downstream purification steps such as distillation, membrane separation, adsorption or chemical stripping.

In addition to retrieving the system data of the exhaust gas purification system from the data cloud, the inventive method further comprises determining at least one quantity characterizing the exhaust gas purification system based on the retrieved system data. The quantity characterizing the exhaust gas purification system describes an operating characteristic of the exhaust gas purification system. The quantity characterizing the exhaust gas purification system can describe both an instantaneous characteristic of the exhaust gas purification system and a characteristic of the exhaust gas purification system over a longer period of time. The quantity characterizing the exhaust gas purification system can be varied and depend, for example, on the type of exhaust gas purification system. It is to be understood that, according to embodiments, not only a single quantity characterizing the exhaust gas purification system can be determined from the system data, but (in parallel or sequentially) a variety of quantities characterizing the exhaust gas purification system may also be determined. For example, several of the quantities characterizing the exhaust gas purification systems described below can be determined in parallel or sequentially according to the inventive method.

The quantity characterizing the exhaust gas purification system may be, for example, a status of the exhaust gas purification system. For example, it may be determined from the system data, whether the actual operation of the system deviates from a given or predetermined target operation. The quantity characterizing the exhaust gas purification system can also be, for example, an energy index (e.g., energy consumption, fuel consumption, etc.) or a material index (e.g., pollutant balance, amount of exhaust gas processed, etc.) describing an instantaneous operation of the exhaust gas purification system or the operation of the exhaust gas purification system over a longer period of time. The quantity characterizing the exhaust gas purification system can also describe a trend or a development of the exhaust gas purification system (e.g., an operating parameter or measurement parameter of the exhaust gas purification system changes over a longer period of time).

The automated determination of the quantity characterizing the exhaust gas purification system according to the inventive computer-implemented method may enable an automated, time-efficient and thus less extensive monitoring of the exhaust gas purification system. Calculation routines or algorithms only need to be stored once and can then evaluate the system data stored centrally in the data cloud. A manual evaluation of the system data by suitably qualified personnel can therefore be omitted. The monitoring of the exhaust gas purification system can therefore also be carried out more cost-effectively. For example, one or more quantities characterizing the exhaust gas purification system can be identified for a user or operator of the exhaust gas purification system and automatically determined or derived from the system data by means of the inventive computer-implemented method. In addition to quantities that are conditioned, for example, by the type of exhaust gas purification system (e.g., RTO or TNV, concentrator, and/or condenser), quantities of individual interest to the user or operator may also be automatically determined by means of the inventive computer-implemented method, for example.

Due to the storage of the system data in the data cloud, the system data can be accessed from any location and at any time. The evaluation of the system data or the determination of the quantity characterizing the exhaust gas purification system can thus take place, for example, in the data cloud itself or in a data processing system coupled to the data cloud. For example, an operator or a manufacturer of the exhaust gas purification system can maintain a data processing system to retrieve the system data from the data cloud and evaluate it locally in the data processing system.

In comparison to conventional data collection approaches for exhaust gas purification systems, the data storage in the data cloud not only allows access to current system data, but also to system data of any point in time or period of time. Accordingly, it is not only possible to characterize the exhaust gas purification system based on current system data, but it is substantially possible to evaluate any points in time or periods of time. Due to the storage of the system data in the data cloud, redundant data storage also takes place, so that the risk of data loss is reduced compared to conventional data collection approaches for exhaust gas purification systems.

The inventive computer-implemented method can enable an operator or manufacturer of the exhaust gas purification system to monitor the operation of the exhaust gas purification system more easily via a central means and to track the functioning of the exhaust gas purification system.

According to some embodiments, the computer-implemented method includes, in addition, providing information about the quantity characterizing the exhaust gas purification system for retrieval by an application executed on a terminal device of a user. In this way, the user can easily retrieve the information about the quantity characterizing the exhaust gas purification system and monitor or trace the operation of the exhaust gas purification system via the application. The terminal device of the user can be, for example, a mobile terminal device, such as a smartphone, a tablet computer, or a laptop computer, or a stationary terminal device, such as a computer. The application can be, for example, an application specifically provided for monitoring the exhaust gas purification system. Alternatively, the application can also be a universal application (e.g., an Internet browser). The information about the quantity characterizing the exhaust gas purification system can be provided, for example, as a value or series of values retrievable via the application or as a graphic retrievable via the application. Accordingly, the information about the quantity characterizing the exhaust gas purification system may be provided in a format that is easy to understand for the user.

In some embodiments, the information about the quantity characterizing the exhaust gas purification system is provided on a web site with access restricted to a predetermined user group. The provision of the information about the quantity characterizing the exhaust gas purification system on a web site enables access at any time and place to the quantity characterizing the exhaust gas purification system by the user, and thus a flexible monitoring of the exhaust gas purification system. For example, the output of the information via a web site can also enable the user to create individual notifications using appropriate configuration options on the web site. In addition, the access restriction enables the system monitoring to be secured against access by unauthorized third parties. Access can be restricted, for example, by a password, a security certificate, or local access restrictions.

In addition to the system data, the quantity characterizing the exhaust gas purification system may also be stored in the data cloud according to some embodiments. In other words: the computer-implemented method may further include storing of information about the quantity characterizing the exhaust gas purification system in the data cloud. In this way, the information about the quantity characterizing the exhaust gas purification system may also be stored redundantly in the data cloud, such as to enable access to the information about the quantity characterizing the exhaust gas purification system flexible as to time and place with a minimized risk of data loss.

In some embodiments, the determination of the at least one quantity characterizing the exhaust gas purification system is carried out continuously. This means that the quantity characterizing the exhaust gas purification system is determined steadily (constantly) by the computer-implemented method. In this way, a user can be permanently provided with current values for the characterizing quantity for retrieval. In addition, the continuous determination of the characterizing quantity enables determining temporal courses or temporal changes of the characterizing quantity, which in turn can themselves characterize the exhaust gas purification system or the operating behavior thereof.

In alternative embodiments, the quantity characterizing the exhaust gas purification system is determined discontinuously—for example, periodically or as a result of the occurrence or detection of the occurrence of a predetermined event. If, for example, a specific quantity characterizing the exhaust gas purification system is required only once a year to prepare a legally required report, it may be sufficient to determine this quantity only once a year from the system data. In this way, calculation effort can be saved for unnecessary determinations (e.g. calculations) of the quantity characterizing the exhaust gas purification system.

According to some embodiments, the quantity characterizing the exhaust gas purification system is a quantity directly measurable at the exhaust gas purification system, but which (in reality) is not measured at the exhaust gas purification system. The term "directly measurable" is to be understood in such a way in this context that the quantity considered would (theoretically) be directly measurable at the respective element of the exhaust gas purification system via an suitably configured sensor if a suitable sensor was installed at the exhaust gas purification system or a sensor installed at the exhaust gas purification system was, for example, functional or calibrated. For example, the volume flow of exhaust gas coming into the exhaust gas purification system could be measured directly via a volume flow sensor at the inlet of the exhaust gas purification system. The direct recording of a quantity characterizing the exhaust gas purification system by means of a dedicated sensor at the exhaust gas purification system can be very cost-intensive due to the sometimes high acquisition costs for the sensor. In many cases, it is possible to derive a quantity characterizing the exhaust gas purification system from other measurement data that are recorded as well. For example, a quantity characterizing the exhaust gas purification system can be derived from other recorded measurement data by means of thermodynamic correlations or oxidation calculations. In the above example, the volume flow can be calculated or determined from the difference of pressures measured along the exhaust gas stream, for example. The inventive method can thus determine quantities characterizing the exhaust gas purification system without direct measurement and without the use of sometimes high-priced sensors. This is made clear once again in the following example.

A quantity of interest may, for example, be the efficiency of the exhaust gas purification system, which indicates which portion of one or more pollutants fed into the exhaust gas purification system is removed from the exhaust gas stream or exhaust air stream by the exhaust gas purification system. The efficiency $\eta_{Pollut}$ can be defined as follows:

$$\eta_{Pollut} = \frac{c_{Input} - c_{Output}}{c_{Input}} = 1 - \frac{c_{Output}}{c_{Input}} \qquad (1)$$

In the mathematical expression (1) $c_{Input}$ denotes the concentration of the at least one pollutant in the exhaust gas stream to be purified which comes into the exhaust gas purification system and $c_{Output}$ the concentration of the at least one pollutant in the purified exhaust gas stream which is discharged from the exhaust gas purification system. The two pollutant concentrations characterizing the exhaust gas purification system could be measured continuously and directly (immediately) in the exhaust gas stream to be purified or in the purified exhaust gas stream by means of suitable sensors. However, appropriate sensors are high-priced, which is why it is desirable to install as few such sensors as possible or no such sensors in the exhaust gas purification system. Instead of the concentrations of the pollutant in the exhaust gas streams, e.g., the respective numbers of pollutant particles in the exhaust gas stream to be purified and the purified exhaust gas stream may alternatively be measured. The level of particle separation and, hence, the efficiency $\eta_{Pollut}$ of the exhaust gas purification system may be determined analogously to the above mathematical expression (1) based on the number of particles in the exhaust gas stream to be purified and the number of particles in the purified exhaust gas stream.

In the present case, the concentration of the at least one pollutant in the exhaust gas stream to be purified that is fed into the exhaust gas purification system can be determined, according to the invention, from the system data as the quantity characterizing the exhaust gas purification system. For this purpose, various approaches are possible, wherein three approaches are described below merely as examples.

For example, the pollutant sensor for direct measurement of the concentration of the at least one pollutant in the exhaust gas stream to be purified can be omitted and the concentration can be determined from measurement values of an already present carbon dioxide sensor of the exhaust gas purification system, which measures a carbon dioxide concentration in a purified exhaust gas stream, which is transmitted from the exhaust gas purification system. The carbon dioxide concentration in the purified exhaust gas stream corresponds to the sum of the carbon dioxide comprised in the exhaust gas stream to be purified and to the carbon dioxide generated during the conversion of the pollutant (e.g. by TNV). The concentration of the at least one pollutant (e.g. measured as organically bound carbon by means of a flame ionization detector) correlates with the amount converted into carbon dioxide.

When determining the concentration of the at least one pollutant in the exhaust gas stream to be purified, it can optionally also be taken into account that, for example, the oxidation of the exhaust gas stream to be purified results in different volume flows for the exhaust gas stream coming into the exhaust gas purification system or the exhaust gas stream discharged from the exhaust gas purification system. Such dilution effects can be taken into account, e.g., via one or more correction terms (of the same or different order).

Alternatively, the concentration of the at least one pollutant in the exhaust gas stream to be purified can also be determined, for example, from measurement values of an explosimeter of the exhaust gas purification system which measures a concentration of potentially explosive gases in the exhaust gas stream to be purified. Such concentration meters, also referred to as LEL (lower explosive limit) sensors, are partly already present at the exhaust gas purification system for safety reasons (e.g., in the collector at the inlet of the exhaust gas purification system). The concentration of the at least one pollutant in the exhaust gas stream to be purified can then be determined from the measurement values of the explosimeter, taking into account the calibration of the explosimeter.

Likewise, the concentration of the at least one pollutant in the exhaust gas stream to be purified can also be determined, for example, from measurement values of a mass flow sensor of the exhaust gas purification system measuring a mass flow of a fuel used for a thermal oxidation of the exhaust gas stream to be purified. A higher concentration of the at least one pollutant in the exhaust gas stream to be purified correlates with a lower amount of fuel needed, since the fuel is substituted by the increased pollutant rate in the exhaust gas stream to be purified.

The concentration of the at least one pollutant in the purified exhaust gas stream can, for example, be measured once when putting the machine into service or during periodically recurring measurements in line with legal provisions (e.g., in accordance with § 28 of the Federal Immission Control Act (Bundes-Immissionsschutzgesetz) in Germany) in a representative operation mode of the exhaust gas purification system and assumed to be substantially constant. The measurement value for the concentration of the at least one pollutant in the purified exhaust gas stream can be, e.g., automatically sent to the data cloud by the exhaust gas purification system or manually entered into the data cloud by an operator of the exhaust gas purification system, for example.

In some embodiments, the inventive computer-implemented method may further include determining a pollutant balance of the exhaust gas purification system for a predetermined period of time based on the determined concentration of the at least one pollutant in the exhaust gas stream to be purified. The pollutant balance of the exhaust gas purification system balances the amount of the at least one pollutant fed into the exhaust gas purification system and the amounts of the at least one pollutant discharged from the exhaust gas purification system. In other words: The pollutant balance of the exhaust gas purification system indicates which mass flow of the at least one pollutant was disposed of by the exhaust gas purification system and which mass flow of the at least one pollutant was discharged into the atmosphere as a purified gas emission in the predetermined period of time. The amount of pollutants fed into the exhaust gas purification system in the predetermined period of time results from the data of the volume flow of the exhaust gas fed into the exhaust gas purification system and the associated concentration of the at least one pollutant.

The pollutant balance can further be based on an individual measurement value of the concentration of the at least one pollutant in the purified exhaust gas stream discharged from the exhaust gas purification system comprised in the retrieved system data. As stated above, the concentration of the at least one pollutant in the purified exhaust gas stream can be assumed to be substantially constant so that, for example, this value can be balanced via the amount of exhaust gas fed into the exhaust gas purification system in the predetermined period of time in order to determine the amount of pollutants emitted by the exhaust gas purification system into the atmosphere in the predetermined period of time. In other words: the individual measurement value can be regarded as a reference measurement value that is measured only once.

With reference to the embodiment above, the efficiency of the exhaust gas purification system can also be determined via the amount of exhaust gas fed into the exhaust gas purification system in the predetermined period of time in order to determine the amount of pollutants detoxified in the exhaust gas purification system in the predetermined period of time.

The pollutant balancing with respect to the exhaust gas purification system may enable a user to monitor the proper functioning of the exhaust gas purification system. In addition, pollutant balancing with regard to the exhaust gas purification system can make it easier for the user to comply with legal regulations and reporting obligations.

For example, the at least one pollutant may be one or more organic or inorganic solvents. In Germany, users of solvents are obliged to prepare an annual solvent balance in accordance with the Federal Immission Control Act. In the balance, the user lists the solvent masses used and their fate (recovery, remaining in products, disposal, fugitive emissions).

For example, the user demonstrates by means of his inventory management that 500 tonnes of ethyl acetate per year are used as solvent for printing a flexible packaging. Furthermore, it can be determined via measurements and/or estimations that the exhaust air contains 4 g of ethyl acetate per $m^3$ before the exhaust gas purification. The exhaust air purification system is operated, for example, at 3,500 h per year with a volume flow of 30,000 m³/h (corresponds to 420 t/a). The exhaust gas purification system achieves a purification to 20 mg/m³ (e.g. known from individual measurement). This corresponds to about 2 t/a of solvent emissions into the atmosphere. This results in a balance sheet deficit of 80 t/a. The user can exclude (e.g. postulate for the example case) that solvent remains in the product. Furthermore, in this example, no solvents are recovered from the exhaust air, so that the rest leaves production as so-called "fugitive emissions from undocumented sources" (e.g., hall ventilation is to be named here).

The solvents fed into the exhaust air purification system generally do not represent a constant mass flow. The concentration in the exhaust air as well as the exhaust air volume flow vary in part considerably.

A continuous recording of the concentrations before and after the exhaust gas purification system, as it would be necessary for an accurate balancing, is often not given due to the high costs associated therewith. While the purified gas values tend to fluctuate less (see above), the values of the solvent concentration in the exhaust gas stream to be purified and the exhaust gas volume flow represent a considerable mathematical (balance sheet) uncertainty. By means of the indirect determination of the concentration of the at least one pollutant in the exhaust gas stream to be purified and the volume flow from the system data of the exhaust gas purification system described above, the quantities required for the balancing can be determined with little effort and automatically. This results in a significant simplification as well as time and thus cost savings for the user.

According to some embodiments, the quantity characterizing the exhaust gas purification system may also be, for example, an energy consumption of the exhaust gas purification system for a predetermined period of time and/or a predetermined operation mode of the exhaust gas purification system. Accordingly, the energy consumption of the exhaust gas purification system can be recorded by means of the inventive computer-implemented method. In this connection, the energy consumption of the exhaust gas purification system can be both the total energy consumption of the exhaust gas purification system and an energy consumption related to a specific energy source or a specific energy type. For example, the electrical energy consumed by the exhaust gas purification system or the energy consumed by the exhaust gas purification system in the form of fuels (e.g., natural gas or biogas) can be determined from the system data. The determined energy consumptions can, for example, be analyzed with regard to energy saving potentials and thus be used to increase the energy efficiency of the exhaust gas purification system. The automatically determined energy consumption can also make it easier to comply with reporting obligations (e.g., DIN EN ISO 50001), since an extensive and labor-intensive manual data evaluation by qualified personnel can substantially be omitted. The energy consumptions can also be used for conclusions about a proper operation of the exhaust gas purification system.

The energy consumption can be derived from various quantities measured at the exhaust gas purification system. For example, the amount of fuel consumed (e.g., natural gas), a volume flow of the exhaust gas stream to be purified (e.g., incl. solvents), the electrical energy consumed to drive fans and pumps or the electrical energy consumed to generate or conduct compressed air can be measured and the energy consumption of the exhaust gas purification system can be determined therefrom. Exhaust gas losses, process heat generated by the exhaust gas purification system or transmission heat losses can also be taken into account, for example. In this connection, it should be noted again that the above-mentioned quantities are chosen merely as examples and other or more or less quantities may also be considered.

According to the invention, for a predetermined period of time and/or a predetermined operation mode of the exhaust gas purification system, the amount of energy consumed (required) for the purification or treatment of a predetermined volume of exhaust gas or exhaust air can be determined, for example. If the amount of exhaust gas or exhaust air generated during the manufacturing of a product is known, the amount of energy consumed for the manufacturing of a specific amount or a specific volume of the product can also be determined for the exhaust gas purification or exhaust air purification. For example, if the exhaust gas purification system provides process heat, the amount of energy consumed to generate or provide a predetermined amount of process heat can also be determined. An operator or manufacturer of the exhaust gas purification system can thus be enabled to characterize the exhaust gas purification system in a variety of ways with regard to the consumption of energy.

In some embodiments of the inventive method, the determined energy consumption of the exhaust gas purification system can also be compared with one or more planned energy consumptions. In this way, an actual consumption can be compared with a target consumption, for example. In the same way, it can also be shown, for example, to an operator of the exhaust gas purification system how much of the energy consumed was consumed for the basic operation of the exhaust gas purification system (e.g. system ready for operation but idling) and how much energy was consumed depending on the load. In this way, for example, energy consumptions can be compared between several years— irrespective of the production tonnage, i.e. the actual amount of exhaust gas or exhaust air treated.

When determining the energy consumption, it is in turn possible to use quantities derived from the system data instead of directly measured quantities. For example, determining the energy consumption may include deriving, from at least a part of the retrieved system data, a quantity directly measurable at the exhaust gas purification system that is not measured at the exhaust gas purification system. For example, a volume flow can be derived from existing pressure measurements according to the principles described above instead of being measured directly at the exhaust gas purification system. Determining the energy consumption then includes a corresponding determination of the energy consumption based on the quantity derived. As already mentioned above, the energy consumption can thus be determined without the use of sometimes high-priced sensors. The monitoring of the exhaust gas purification system with regard to its energy consumption can thus be carried out more cost-effectively.

In addition to the energy consumption, an energy balance of the exhaust gas purification system can also be determined from the system data according to some embodiments, which indicates how much energy was fed into the exhaust gas purification system and how much energy was released again from the exhaust gas purification system.

In some embodiments, the quantity characterizing the exhaust gas purification system may also be, for example, an amount of process heat that is generated or can be generated by the exhaust gas purification system in a predetermined period of time. The determination of the amount of process heat that is generated or can be generated may enable an operator of the exhaust gas purification system to be able to better classify the exhaust gas purification system with regard to his energy management concept. The exhaust gas purification system can also be monitored to determine whether the planned amounts of process heat were actually provided by the exhaust gas purification system.

The amount of process heat that is generated or can be generated can be derived from various quantities measured at the exhaust gas purification system. Some examples are described in more detail below.

The amount of process heat that can be generated can be determined, e.g., for an exhaust gas purification system for RTO with hot bypass in above-autothermal operation (without heat use), from the measured position of the hot gas flap (as an estimate for the volume flow of the purified exhaust gas) and the measured or given temperature (adjustable parameter) of the heat transfer medium.

With the same approach, the amount of process heat actually generated can also be determined or estimated for an exhaust gas purification system that operates according to the RTO principle with heat use in above-autothermal operation. Alternatively, the process heat actually generated can also be determined, for example, from the measured flow rate of the heat transfer medium through the heat transfer apparatus and the associated temperature difference (between outlet and inlet of the heat transfer medium into/out of the heat transfer apparatus).

The amount of heat recovered from the exhaust gas or the exhaust air that could be reused during operation can thus be presented to an operator of the exhaust gas purification system.

For example, it is further possible to determine the amount of process heat generated and the amount of solvents used for this in above-autothermal operation of the exhaust gas purification system. The operator of the exhaust gas purification system can thus better characterize the exhaust gas purification system and integrate it into his energy management concept. The operator of the exhaust gas purification system can also verify whether the exhaust gas purification system generates process heat in accordance with the requirements (e.g., in accordance with the design).

The generation of process heat can be energetically advantageous in the exhaust gas purification system irrespective of the operation mode, for example, even if natural gas is used in the combustion chamber at the same time. In this context, the amount of solvent that was consumed up to the autothermal operating point of the exhaust gas purification system and the amount of solvent that can be additionally used in the exhaust gas stream or exhaust air stream to be purified can be taken into account, for example. An operator of the exhaust gas purification system can thus see from the balance the amount of process heat generated and the amount of solvent and fuel used for this. The operator of the exhaust gas purification system can thus better characterize the exhaust gas purification system and integrate it into his energy management concept. The operator of the exhaust gas purification system can also verify whether the exhaust gas purification system generates process heat in accordance with the requirements (e.g., in accordance with the design).

When determining the amount of process heat that is generated or can be generated, it is in turn possible to use quantities derived from the system data instead of directly measured quantities. For example, determining the amount of process heat that is generated or can be generated may include deriving a quantity directly measurable at the exhaust gas purification system, which is not measured at the exhaust gas purification system, from at least a part of the retrieved system data. For example, a volume flow can be derived from existing pressure measurements according to the principles described above instead of being measured directly at the exhaust gas purification system. Determining the amount of process heat that is generated or can be generated then accordingly comprises determining the amount of process heat that is generated or can be generated based on the quantity derived. As already mentioned above, the amount of process heat that is generated or can be generated can thereby be determined without the use of sometimes high-priced sensors.

In some embodiments, the quantity characterizing the exhaust gas purification system may be, for example, an amount of fuel consumed in a predetermined period of time and/or in a predetermined operation mode. In this way, the consumption of operating materials by the exhaust gas purification system can be easily monitored. For example, the amount of natural gas consumed at an exhaust gas purification system operating according to the TNV principle, or an amount of injected urea in a DeNOx stage, or an amount of acid or base used in a scrubber can be monitored.

As indicated above, an exhaust gas purification system may comprise one or more concentration apparatuses/stages for increasing a concentration of at least one pollutant in the exhaust gas stream to be purified. Accordingly, the quantity characterizing the exhaust gas purification system may characterize a concentration process in the exhaust gas purification system. For example, the quantity characterizing the exhaust gas purification system may be an amount of desorption and/or condensation at a desorption and/or condensation stage of the concentration process.

In other examples, an exhaust gas purification system may comprise one or more condensation apparatuses/stages for condensing at least one pollutant in the exhaust gas stream to be purified (e.g. in combination with at least one upstream concentration apparatus/stage). Accordingly, the quantity characterizing the exhaust gas purification system characterizes a condensation process in the exhaust gas purification system. For example, the quantity characterizing the exhaust gas purification system may be a condensation rate of the at least one pollutant as a function of one or more operating parameters of the exhaust gas purification system (e.g. consumed electrical power, flow rate of a gas stream, temperature, etc.). In other examples, the quantity characterizing the exhaust gas purification system may be a quantity characterizing fog formation in the condensation process (e.g. based on measurement data of a scatterometer, an ultrasonic anemometer or a laser diffraction spectrometer stored in the data cloud as system data).

In some examples, a particle filter may be arranged upstream of the condenser in the exhaust gas purification system to precipitate pollutant particles from the exhaust gas stream prior to e.g. solvent condensation. Accordingly, the quantity characterizing the exhaust gas purification system may be a filter efficiency of the particle filter. For example, the filter efficiency may be determined based on the number of particles in the exhaust gas stream to be purified before and after the particle filter.

In other examples, the quantity characterizing the exhaust gas purification system may characterize a solvent recovery process in the exhaust gas purification system for recovering at least one solvent from the exhaust gas stream by means of condensation. For example, the solvent in the exhaust gas stream to be purified may be condensed and collected in the solvent recovery process. For example, the quantity characterizing the exhaust gas purification system may be an energy consumed by the exhaust gas purification system per unit mass of recovered solvent. Alternatively, the quantity characterizing the exhaust gas purification system may be an amount of solvent recovered from the exhaust gas stream as a function of one or more operating parameters of the exhaust gas purification system (such a recirculation rate of a gas stream, flow rates of gas streams, temperatures in certain stages of the exhaust gas purification system, etc.).

The quantity characterizing the exhaust gas purification system may, e.g., be a solvent balance of the exhaust gas purification system for a predetermined period of time. The solvent balance of the exhaust gas purification system balances the amount of the at least one solvent fed into the exhaust gas purification system and the amounts of the at least one solvent discharged from the exhaust gas purification system. In other words: The solvent balance of the exhaust gas purification system indicates which mass flow of the at least one solvent was disposed of by the exhaust gas purification system and which mass flow of the at least one solvent was discharged into the atmosphere as a purified gas emission in the predetermined period of time. For example, the solvent balance may be determined based on measurement values contained in the system data for a) concentrations of the one or more solvents in the exhaust gas stream to be purified and other gas streams processed by the exhaust gas purification system and b) for flow rates of the exhaust gas stream to be purified and the other gas streams.

Further, the system data may allow to determine leakages in the exhaust gas purification system. Accordingly, the quantity characterizing the exhaust gas purification system may characterize leakage at a component of the exhaust gas purification system. For example, flow rates and/or mass flow rates of gas streams processed by the component of the exhaust gas purification system (e.g. an input stream and an output stream of the component) may be analyzed to detect leakage.

In other examples, the quantity characterizing the exhaust gas purification system may characterize overstressing of a mechanical component of the exhaust gas purification system. For example, the system data (e.g. comprising measurement data of a vibration sensor or measurement data for the energy consumption of the component) may allow to detect an imbalance of a concentrator wheel or wear of a mechanical component.

According to some examples, the quantity characterizing the exhaust gas purification system is additionally determined based on further system data of the industrial system or the industrial process itself, which is (received by and) stored in the data cloud. The further system data of the industrial system or the industrial process itself relate to at least measurement data of at least one sensor of the industrial system or the industrial process and/or data about at least one adjustable parameter of the industrial system or the industrial process (flow rates of gas streams, temperatures, etc.).

As already indicated in the examples discussed above, further characteristics or indexes can also be derived from the quantities characterizing the exhaust gas purification system. In some embodiments, the inventive computer-implemented method thus further includes determining a characteristic of the exhaust gas purification system based on the quantity characterizing the exhaust gas purification system.

In some embodiments, the inventive computer-implemented method further includes issuing a message to at least one terminal device of a user if the quantity characterizing the exhaust gas purification system is outside a predetermined value range. Accordingly, the user may be informed about an operation of the exhaust gas purification system outside the given specifications so that the user can react accordingly. For example, a message or an e-mail can be sent to the at least one terminal device of the user. Accordingly, the inventive computer-implemented method may also include outputting a message to a terminal device of a user if the measurement data of the at least one sensor of the exhaust gas purification system included in the system data are outside a predetermined value range.

According to the invention, the computer-implemented method can also be used to monitor several exhaust gas purification systems coupled to the data cloud. For example, several exhaust gas purification systems can be compared with each other. Accordingly, the inventive computer-implemented method comprises, according to some embodiments, a retrieval of system data of a further exhaust gas purification system from the data cloud. The system data of all exhaust gas purification systems are the same with regard to their type and structure, respectively. According to the principles described above, the method further includes determining the characterizing quantity for the further exhaust gas purification system based on the retrieved system data of the further exhaust gas purification system. In addition, the method includes determining comparative information based on the characterizing quantity for the exhaust gas purification system and the characterizing quantity for the further exhaust gas purification system. The comparative information describes a relation or a ratio between the characterizing quantity for the exhaust gas purification system and the characterizing quantity for the further exhaust gas purification system. For example, the comparative information may be a ratio of the characterizing quantity or a graphical comparison of the characterizing quantity for both exhaust gas purification systems. A user can thus be enabled to directly compare the exhaust gas purification systems. From the comparison, the user may, for example, draw conclusions about the performance or necessary changes to the one exhaust gas purification system in comparison to the other exhaust gas purification system. The inventive computer-implemented method can thus enable, for example, an operator or a manufacturer of the exhaust gas purification systems to monitor several exhaust gas purification systems more easily.

Embodiments of the invention further also relate to a non-transitory machine-readable medium on which a program is stored with a program code for executing the inventive method for monitoring at least one exhaust gas purification system when the program is executed on a processor or a programmable hardware component. The non-transitory machine-readable medium may be implemented, for example, as a ROM, PROM, EPROM, EEPROM, FLASH memory or as another magnetic, electrical or optical memory having electronically readable control signals stored thereon, which cooperate or are capable of cooperating with the processor or the programmable hardware component such that the respective method is performed. A programmable hardware component may be formed, e.g., by a processor, a computer processor (CPU=Central Processing Unit), an Application-Specific Integrated Circuit (ASIC), an Integrated Circuit (IC), a System on Chip (SOC), a programmable logics element, a Field Programmable Gate Array comprising a microprocessor (FPGA), a back end or a data cloud. The program code may among others be present as a source code, machine code or byte code or any other intermediate code.

In addition, embodiments of the invention also relate to a program comprising a program code for executing the inventive method for monitoring at least one exhaust gas purification system when the program is executed on a processor or a programmable hardware component.

According to a further aspect, the invention further relates to a data processing system for monitoring the state of at least one exhaust gas purification system (e.g., for purifying an exhaust gas stream of an industrial system or an industrial process). The data processing system comprises at least one processor configured to retrieve system data of the exhaust gas purification system from a data cloud. The system data stored in the data cloud were at least partially received beforehand by the data cloud from the exhaust gas purification system. The system data relate to at least measurement data of at least one sensor of the exhaust gas purification system and/or data about at least one adjustable parameter of the exhaust gas purification system. In addition, the system data may include one or more of the above-mentioned further subsets of system data. Additionally, the at least one processor is configured to determine a quantity characterizing the exhaust gas purification system based on the retrieved system data.

As already described above in connection with the inventive computer-implemented method, the inventive data processing system can also make it possible to monitor the operation of the exhaust gas purification system simply and centrally and to track the function of the exhaust gas purification system.

For example, the data processing system may be part of the data cloud and the at least one processor may thus be a virtual or physical processor of the data cloud. Accordingly, the entire monitoring of the exhaust gas purification system can take place in the data cloud, so that a local provision of an accordingly powerful data processing system by, e.g., an operator or a manufacturer of the exhaust gas purification system is unnecessary. Instead, the system monitoring in the data cloud can be easily accessed as a service. In other words: The steps of the inventive computer-implemented method described herein can all be executed in the data cloud or via the data cloud.

In some embodiments, the data processing system may alternatively also be, for example, a computer, a server, a server system or a back end that can access the data cloud and can be operated, for example, by an operator or a manufacturer of the exhaust gas purification system. According to further embodiments, the data processing system may further be a terminal device of a user capable, which can access the data cloud.

In one aspect, the invention additionally also applies to an exhaust gas purification system for purifying an exhaust gas stream to be purified of an industrial system or an industrial process (e.g., of the chemical or pharmaceutical industry). The inventive exhaust gas purification system comprises at least one inlet for introducing the exhaust gas stream to be purified into the exhaust gas purification system and one outlet for transmitting a purified exhaust gas stream from the exhaust gas purification system. Furthermore, the inventive exhaust gas purification system includes a communication interface configured to send system data generated in the exhaust gas purification system to a data cloud, the system data relating to at least measurement data of at least one sensor of the exhaust gas purification system and data about at least one adjustable parameter of the exhaust gas purification system.

The inventive exhaust gas purification system can enable a redundant storing of the system data in the data cloud, so that the risk of data loss is reduced compared to conventional data collection approaches for exhaust gas purification systems. Due to the storage of the system data in the data cloud, the system data can additionally be accessed from any location and at any time.

The communication interface can, for example, be coupled to the data cloud wirelessly or wired via the Internet or a local network. According to embodiments, not only a data transfer from the exhaust gas purification system to the data cloud can take place, but also vice versa. For example, the communication interface may be configured to receive configuration data or software updates for the exhaust gas purification system from the data cloud. Accordingly, a programmable hardware component of the exhaust gas purification system may be configured to process the configuration data or software updates.

The system data of the exhaust gas purification system sent to the data cloud may include unprocessed raw data of the exhaust gas purification system, data pre-processed by the exhaust gas purification system, or a combination thereof.

Depending on the type of treatment (e.g., catalytic, mechanical or catalytic) of the exhaust gas stream to be purified, the exhaust gas purification system may have one or more purifying devices for purifying the exhaust gas stream to be purified (e.g., combustion chamber, filter, etc.).

For example, the exhaust gas stream to be purified may be circulation air laden with at least one condensable fluid (such as e.g. N-methyl-2-pyrrolidone, NMP) generated by an air dryer, preferably a web dryer, especially a web process convection air dryer. Accordingly, the exhaust gas purification system may comprise at least one main condenser having a feed port and an exhaust port and at least one main condensation stage. The at least one main condenser comprises a condensation chamber being accessible by or permeable for the circulation air, and a cooling coil at least partially arranged inside said condensation chamber and permeated by a cooling medium. The cooling coil of said main condenser is operated with a main cooling medium temperature of 0° C. or less. Further, the exhaust gas purification system may comprise a circulation air feed line being connected to said feed port of said main-condenser and being connectable to a source of condensable fluid laden air such as an exhaust circulation air duct of said dryer or dryers for carrying the circulation air. A circulation air exhaust line is connected to said exhaust port of said main condenser and is connectable to a feed circulation air duct of said dryer or dryers. Further, a side-stream off gas extraction line is fluidly connected to at least said condensation chamber of said main condenser. A volume flow of a circulation air streaming in said condensation chamber is split into a high-volume re-circulation stream leaving the condenser through the circulation air exhaust line and a low volume off-gas side stream. The high-volume re-circulation stream may be understood as the purified exhaust gas stream.

In certain examples, the side-stream and the re-circulation stream are split in volume by a split-ratio between 0.1% and 20%, preferably between 0.5% and 10%, and even more preferably between 1% and 5%.

In certain aspects, the exhaust gas purification system may further comprise at least a pre-condenser with at least one pre-condensation stage that is placed in the circulation air stream upstream of the main condenser and comprises a pre-condenser condensation chamber being accessible by or permeable for the circulation air, and a cooling coil at least partially arranged inside said pre-condenser condensation chamber and permeated by a pre-cooling medium, whereby the pre-cooling medium has a temperature higher than the main cooling medium temperature.

The pre-condenser and said main-condenser may be enclosed in a common condenser housing.

The exhaust gas purification system of any of the foregoing embodiments, alone or in combination, may further comprise a pre-cooling heat exchanger arranged upstream of the pre-condensation stage or at least upstream the main condensation stage to already reduce a temperature of the streaming in circulation air and/or a reheating heat exchanger being arranged downstream of the main condensation stage. The pre-cooling heat exchanger and the re-heating heat exchanger may be thermally coupled by the exchange of a heat transfer medium such as water, brine and/or suitable thermal fluid and/or thermally coupled by a thermocouple or heat pipe. In some examples, the pre-cooling heat exchanger and the re-heating heat exchanger are in addition or alternatively thermally coupled via at least one thermocouple or heat pipe.

The exhaust gas purification system of any of the foregoing embodiments, alone or in combination, may further comprise an air pollution control unit fluidly connected to the side-stream off gas extraction line and having at least one adsorptive concentrator with a gas exhaust and a desorption exhaust as a first pollution control stage and at least a second pollution control stage being selected from the group consisting of a filtration device, an absorptive concentrator, a thermal oxidizer, and a catalytic device. The second pollution control stage may comprise an adsorptive concentrator that is feed by the gas exhaust of the first pollution control stage and having a gas exhaust and a desorption exhaust. The desorption exhaust of at least one of the adsorptive concentrators may be connected to a desorption line, which is connected to a desorbate condenser, whereby a gas exhaust of the desorbate condenser is fed back into the side-stream off gas extraction line. The second pollution control stage may comprise at least one activated carbon filter.

The above proposed exhaust gas purification system may allow condensing a majority of the solvent in a process stream at low temperatures (e.g., even below the freezing point of water, ca. −5° C.) compared to conventional thermal coil condensers. The remaining solvent in the gas stream may be below 50 mg/Nm³ owing to the low temperature condensing step. In this temperature range solvents such as NMP or DiMethylAcetamide (DMAc) exhibit anti-freeze behavior depressing the freezing point of the water-solvent mix thus avoiding buildup of ice. In certain embodiments, the gas stream exiting the condenser step is further processed in one or more emission control devices, such as a single or multi-step series of concentrator devices, such as zeolite concentrator devices. The aforementioned condensing process enables the one or more concentrators to operate in a favorable temperature range resulting in the removal of 90 to 99% or more of Volatile Organic Compounds (VOCs), thereby meeting or exceeding strict environmental regulations.

Concentrator flow capacity per given volume of adsorbent media is generally higher at lower removal percentages and is reduced at higher removal percentages. Therefore, the optimal design point for percentage removal of VOC's for a particular solvent laden air stream in each stage being handled with two or more emission control devices in series, the first being a concentrator type, may be in the lower portion of the range of 90 to 99% removal. In one example embodiment, a first step concentrator removes ≥90% of VOC, leaving less than 10% of the incoming amount, e.g., leaving 5 mg/Nm³ when the incoming amount is 50 mg/Nm³. An optional second step concentrator device also removes ≥90% of the incoming VOC from said first step concentrator. The resulting exit concentration is therefore on the order of about 0.5 mg/Nm³, meeting strict environmental regulations, including the new goals of the battery industry, for example.

BRIEF DESCRIPTION OF THE FIGURES

Embodiments of the present invention are explained in more detail below with reference to the accompanying figures. In which.

DETAILED DESCRIPTION

Figure 1:
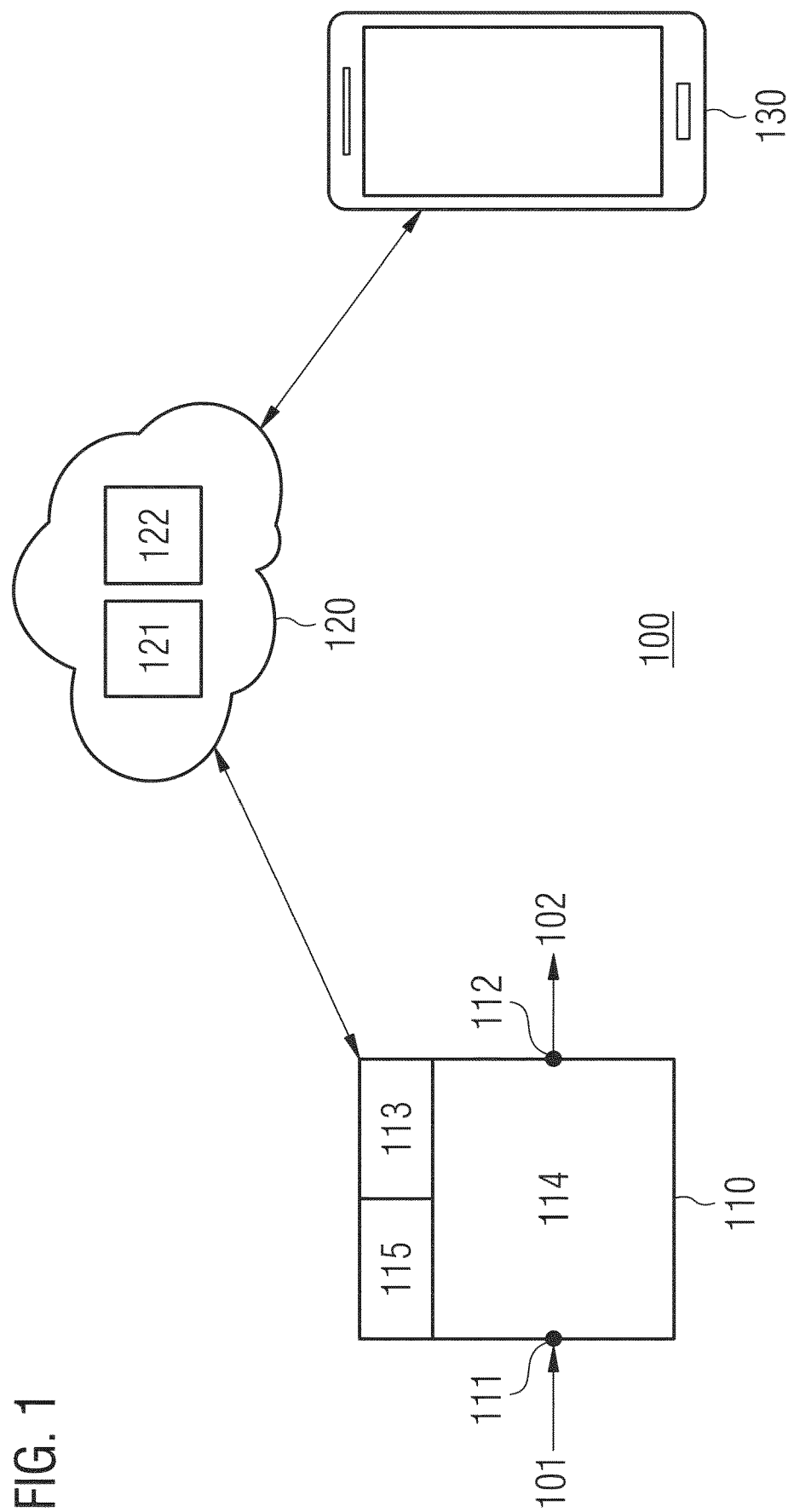
FIG. 1 schematically illustrates a monitoring system for an exhaust gas purification system.

FIG. 1 shows a monitoring system 100 for an exhaust gas purification system 110, which is shown schematically and in a very simplified manner. The exhaust gas purification system 110 comprises an inlet 111 for feeding in an exhaust gas stream 101 to be purified of an industrial system such as a printing machine (not illustrated). Furthermore, the exhaust gas purification system 110 comprises at least one purifying device 114 for purifying the exhaust gas stream 101. For example, the purifying device 114 can purify the exhaust gas stream 101 according to one of the methods described above. The exhaust gas purification system 110 further includes an outlet 112 for transmitting a purified exhaust gas stream 102 from the exhaust gas purification system 110. The exhaust gas purification system 110 also includes at least one sensor 115 to measure a quantity of interest (e.g. a pressure or a concentration of one or more substances) at an element of the exhaust gas purification system 110.

Furthermore, the exhaust gas purification system 110 includes a (wireless or wired) communication interface 113 for connecting the exhaust gas purification system 110 to a data cloud 120. Via the communication interface 113, the exhaust gas purification system 110 can exchange data with the data cloud 120. In particular, the communication interface 113 is configured to send system data generated in the exhaust gas purification system to the data cloud 120. The communication interface 113 can thereby, for example, send the system data continuously, periodically or in an event-triggered manner to the data cloud 120. The system data may include both unprocessed raw data from the exhaust gas purification system 110 and pre-processed data from the exhaust gas purification system 110.

The system data are stored in a storage means 122 of the data cloud 120 (e.g. one or more hard disks), so that the system data can be accessed locally and at any time. Likewise, data loss can be omitted due to the data storage in the data cloud 120. Furthermore, further system data can be entered, for example, manually into the data cloud 120 or received from further systems (e.g. exhaust gas purification system identical or similar to exhaust gas purification system 120—not shown).

Furthermore, the data cloud 120 comprises at least one (virtual or physical) processor 121, which executes the inventive analysis of the system data for monitoring the exhaust gas purification system 110.

For this purpose, the processor 121 is set up to retrieve the system data of the exhaust gas purification system 110 from the storage means 122 of the data cloud 120 and to determine the quantity characterizing the exhaust gas purification system 110 based on the retrieved system data.

Using the quantity characterizing the exhaust gas purification system 110, the current or a past state or the behavior of the system can be described and thus presented to an operator or manufacturer of the exhaust gas purification system 110. Likewise, further characteristics of the exhaust gas purification system 110 can be derived by the processor 121 from the quantity characterizing the exhaust gas purification system 110. The determination of one or more quantities or characteristics characterizing the exhaust gas purification system 110 is carried out according to the principles described above. For example, the processor 121 may be configured to determine an energy consumption or a solvent balance of the exhaust gas purification system 110 according to the principles described above.

The information about the quantity characterizing the exhaust gas purification system 110 may also be stored in the data cloud 120.

Figure 2:
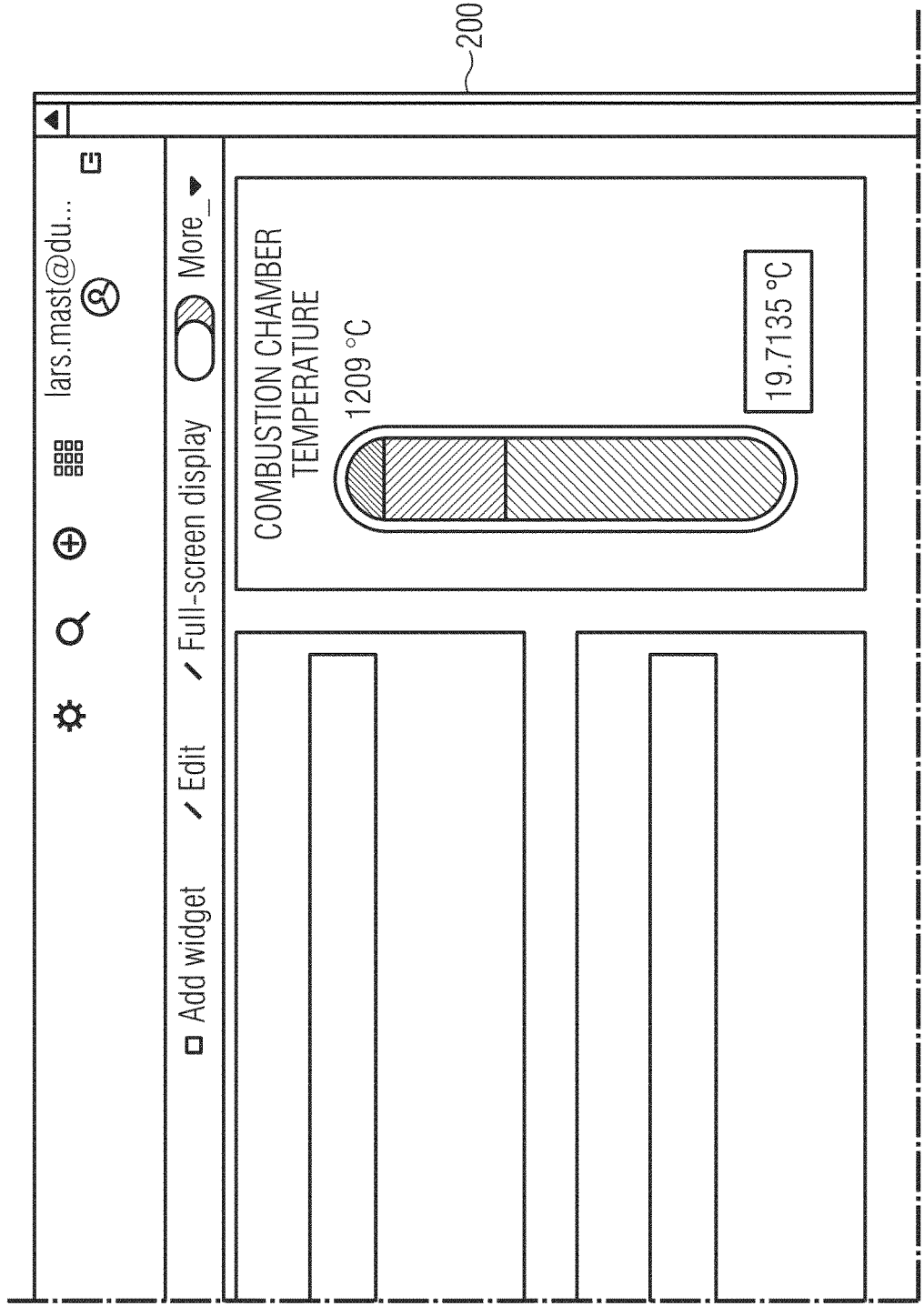
FIG. 2 illustrates an embodiment of a graphical user interface in which various quantities characterizing an exhaust gas purification system are illustrated.

Information about the one or more quantities characterizing the exhaust gas purification system may be displayed to a user, for example, via a graphical user interface generated by the processor 121, which the user can access via a terminal device 130 (e.g. a smartphone or a tablet computer). An example of a graphical user interface 200 is shown in FIG. 2. The graphical user interface 200 can, for example, be output via a dedicated application or as a web site on the terminal device 130 of the user.

In the upper right area of the graphical user interface 200, measured temperatures of the exhaust gas purification system 110, such as the temperatures of the exhaust gas stream to be purified, the purified exhaust gas stream, a bed (e.g., lower bed) of the exhaust gas purification system 110 or the combustion chamber, are illustrated as bars or bar charts. Alternatively, other quantities measured at the exhaust gas purification system 110 or the course of a quantity characterizing the exhaust gas purification system 110 derived from the system data may also be illustrated. For example, volume flows (measured directly or determined, for example, from the converter frequency of a fan), flap positions (e.g., hot gas flap), measurement values of LEL sensors or loading states or the state of a fuel injection can be displayed.

Below, a trend display for interesting quantities of the exhaust gas purification system 110 is integrated into the graphical user interface 200. Here, the course of a quantity measured at the exhaust gas purification system 110 or the course of a quantity characterizing the exhaust gas purification system 110 derived from the system data can be illustrated, for example.

In the lower area, an illustration of the operating hours of the exhaust gas purification system 110 for the individual operation modes is further integrated into the graphical user interface 200.

For example, the graphical user interface 200 can be configured individually for a user. Depending on the sensor equipment of the exhaust gas purification system 110, various quantities or parameters characterizing the exhaust gas purification system 110 can thereby be automatically determined or calculated from the system data and displayed to the user. The user can also use these quantities or parameters for required reports, for example. The output of the respective quantities or values for reports is conducted automatically and thus time-efficiently due to the stored calculation routines.

Furthermore, an event list relating to the various possible operation modes of the exhaust gas purification system 110 is illustrated in the upper left area of the graphical user interface 200. The operating states of the exhaust gas purification system 110 can be determined from the analyzed system data of the exhaust gas purification system 110.

Figures 2, 3:
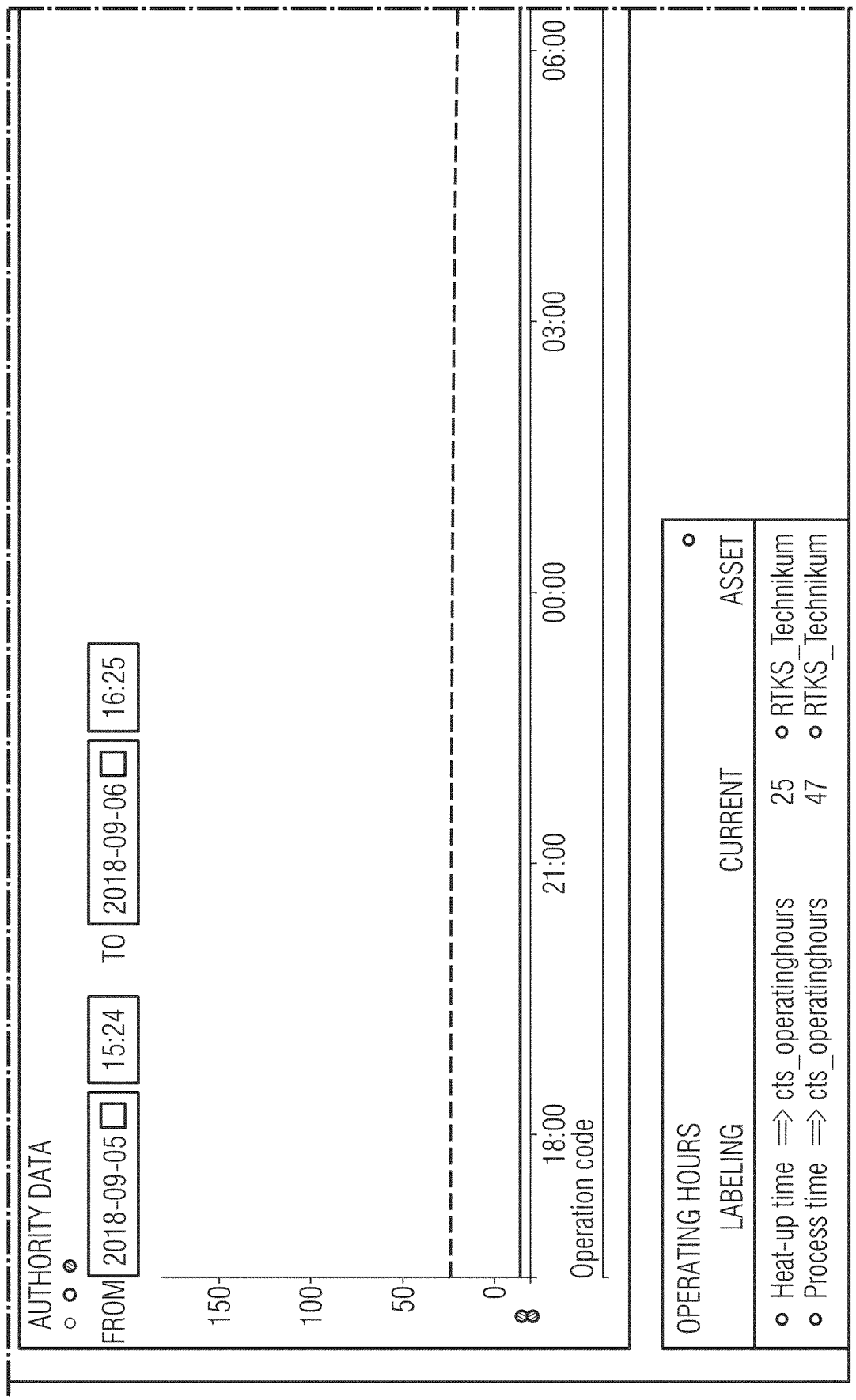
FIG. 3 illustrates an embodiment of operation modes of an exhaust gas purification system.

An example for a hierarchical structure of a plurality of operation modes of an exhaust gas purification system for RTO is illustrated in FIG. 3. The exhaust gas purification system may generally be in either an off-mode operation 300, an on-mode operation 305, or a failure-mode 310.

While the exhaust gas purification system is in the on-mode operation 305, the exhaust gas purification system may be in a start-up-mode operation 315, in which the exhaust gas purification system heats up, or in a shutdown-mode operation 325, in which the exhaust gas purification system is switched off "normally" and flushed with fresh air (mode 326) or cooled after a failure (mode 327). During the on-mode operation 305, the exhaust gas purification system may also be in a purifying-mode operation 330, in which the exhaust gas purification system is purified, or a regular-mode operation 320, in which the exhaust gas stream is purified.

In the regular-mode operation 320, the exhaust gas purification system may be in a below-autothermal-mode operation 335, in which the exhaust gas is purified by means of RTO with an injection of a fuel to ensure a minimum combustion chamber temperature. Alternatively, the exhaust gas purification system may be in a stand-by-mode in the below-autothermal-mode operation 335, in which the combustion chamber temperature is maintained above a minimum temperature with minimum air supply.

Likewise, the exhaust gas purification system may be in an autothermal-mode operation 340 in the regular-mode operation 320, in which the exhaust gas is purified by means of RTO without the addition of further fuel, but hot gas cannot yet be dissipated for process heat recovery.

In the above-autothermal-mode operation 345, the exhaust gas is purified by means of RTO without adding further fuel and the hot gas flap in the exhaust gas purification system is set such as to dissipate the hot gas via a hot bypass for process heat recovery.

In the forced-cooling-mode operation 350, the exhaust gas is purified by means of RTO without the addition of further fuels and the maximum amount of hot gas is dissipated for process heat recovery. In order to protect the exhaust gas purification system from too high oxidation temperatures due to the exothermic nature of the solvent in the exhaust gas, cold air is additionally fed into the combustion chamber.

In the intentional-extraction-mode operation 355, the exhaust gas is purified by means of RTO with an injection of a fuel. At the same time, heat is extracted via the hot bypass of the exhaust gas purification system (controlled by the position of the hot gas flap).

The table below is an overview of the specifications for various adjustable parameters in some of the operation modes mentioned above. The actual values of the parameters can be measured via sensors of the exhaust gas purification system. The measurement values as well as the target values are stored in the data cloud by the exhaust gas purification system and are thus available for the inventive monitoring of the exhaust gas purification system.

| mode | combustion chamber temperature | natural gas injection | hot bypass |
|---|---|---|---|
| below autothermal | less than T1 | Yes | No |
| autothermal | between T1 and T2 | No | No |
| above autothermal | greater than T2 | No | Yes |
| forced cooling | greater than T3 | No | Yes |
| intentional extraction | any | Yes | Yes |

Accordingly, it can be determined from the system data, according to the invention, whether the system behaves according to the specifications for the individual parameters during operation, for example. This allows an automated and efficient monitoring of the exhaust gas purification system.

Figures 2, 3, 4:
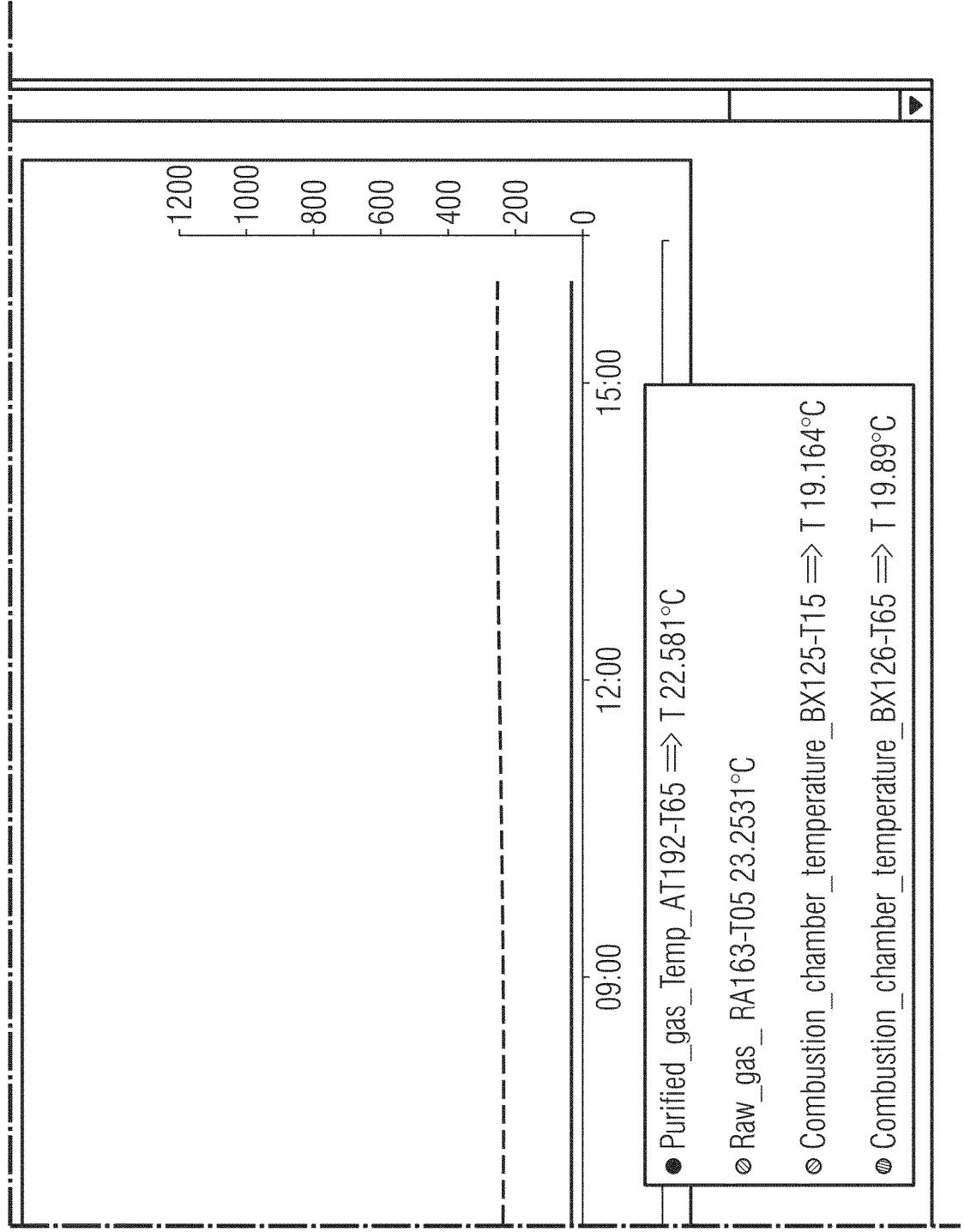
FIG. 4 illustrates an embodiment of a monitored exhaust gas purification system comprising a concentration device and a condensation device.
Figures 1, 3:
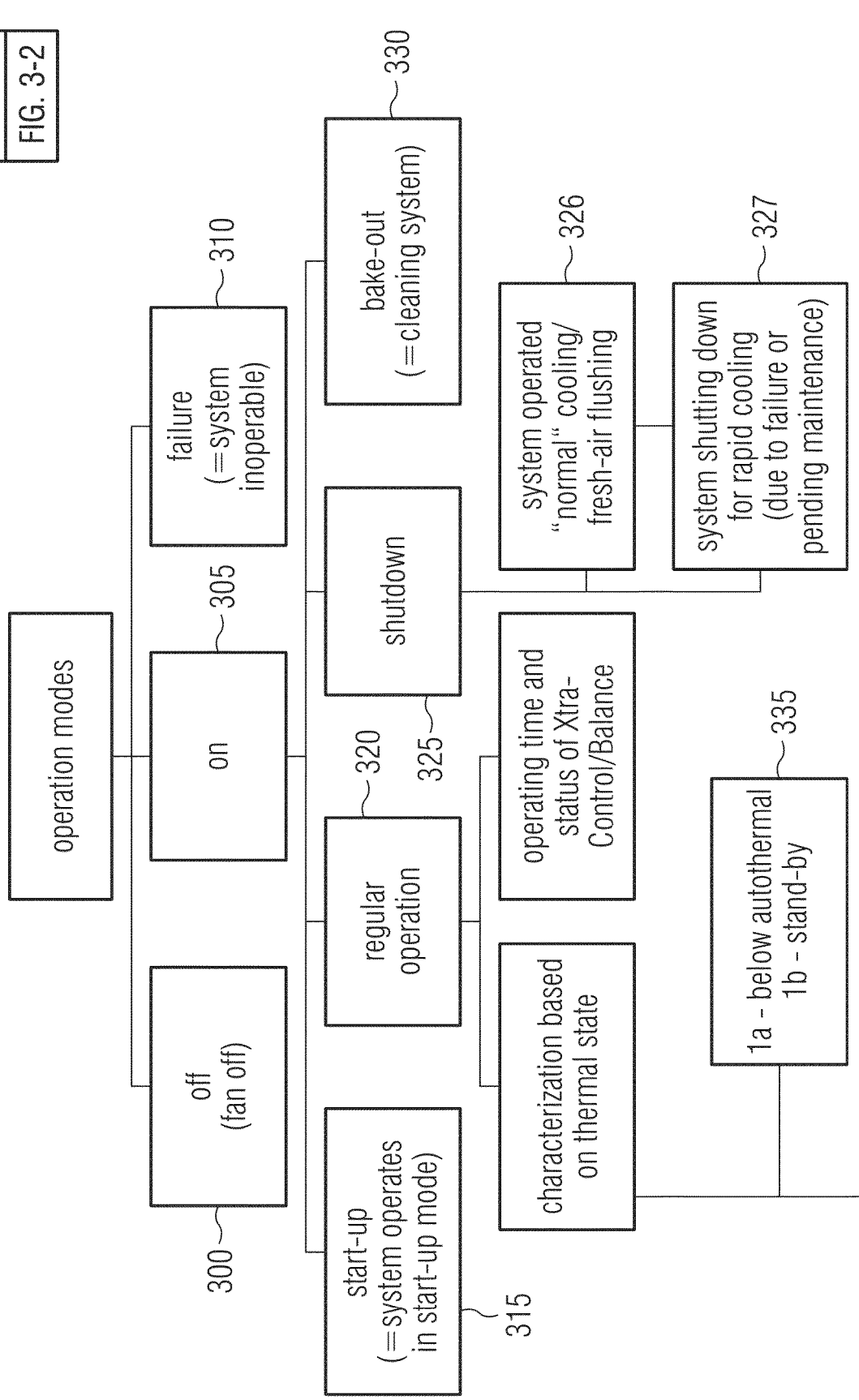
Figure 4:
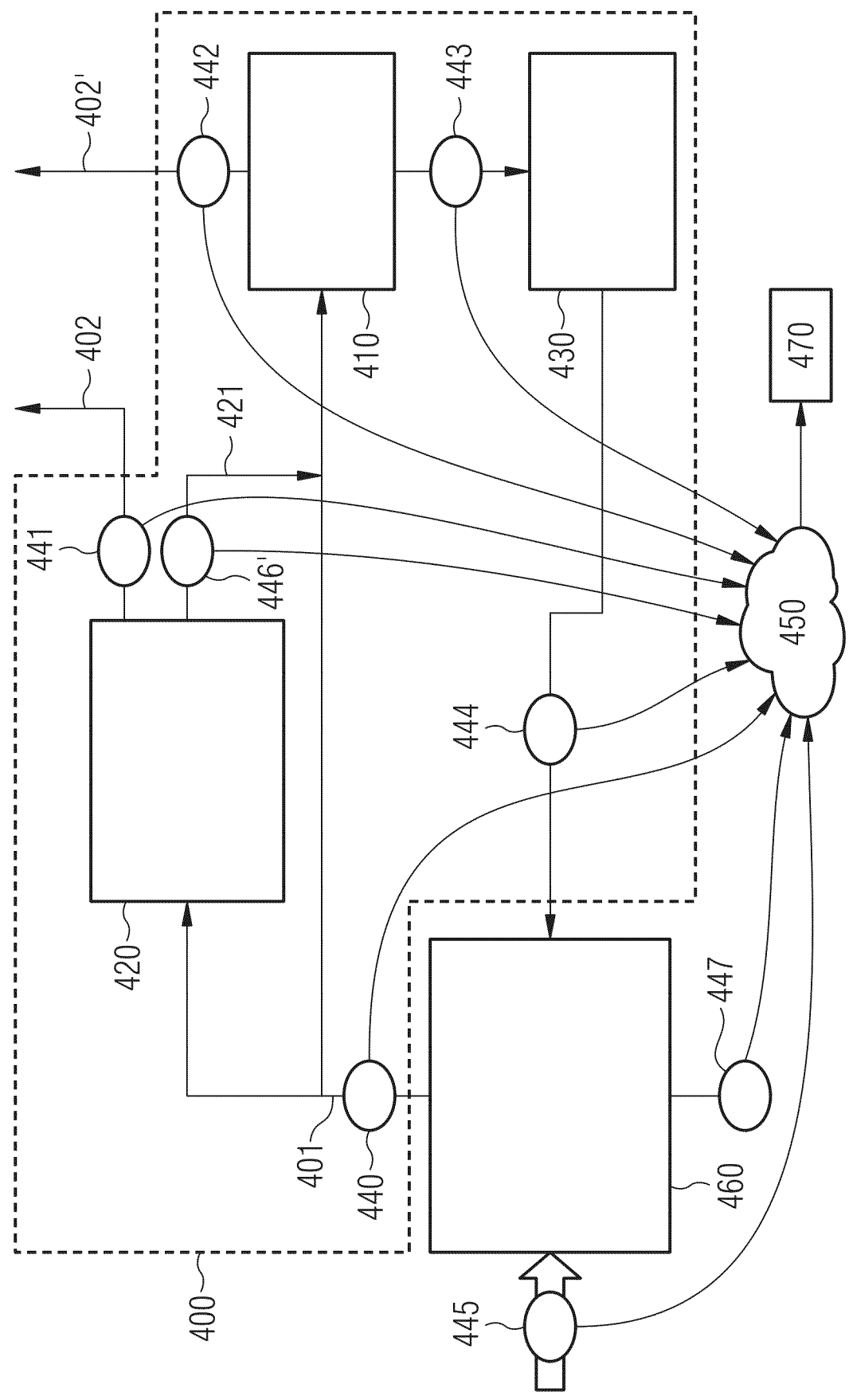

FIG. 4 shows the monitoring of an exhaust gas purification system 400 with solvent recovery. Solvents (e.g., organic solvents such as ethyl acetate, ethanol or isopropanol) are used in various production processes. The solvents sometimes represent a significant resource (costs in part considerably higher than 1 €/kg) so that a solvent recovery may be reasonable for technical and economic reasons.

In this context, an exemplary and very simplified industrial production system 460 is shown in FIG. 4 (e.g., a printing system or a coating system). In addition to the material to be processed (e.g., to be printed or coated), solvent is also fed into the production system 460 (e.g., bound in a printing ink). The solvent input into the production system 460 can be determined, e.g., from measurement values of a sensor 445 (which measures, e.g., the amount of ink in which the solvent is bound). In a printing system, the solvent is released and transmitted together with the exhaust gas stream 401 upon application of the ink, or at the latest upon drying. For reasons provided by the emmission control law, for example, a release of the solvents into the environment is not permissible. Therefore, an exhaust gas purification is carried out by means of the industrial exhaust gas purification system 400.

As illustrated in FIG. 4, the solvent recovery can be carried out by means of various procedural steps. For example, the exhaust gas stream 401 to be purified can first be subjected to a concentration process and subsequently to a desorption process (e.g., by means of water vapor, hot gas or inert gas), before the desorbate generated by this (i.e., the concentrated exhaust gas stream) is fed into a condensation process in order to precipitate the solvent from the exhaust gas stream by means of condensation. This form of solvent recovery is illustrated in FIG. 4 by the concentration device 420 and the condensation device 410. The exhaust gas stream 401 to be purified is first fed into the concentration device 420 that increases the concentration of at least one pollutant contained in the exhaust gas stream 401 to be purified by means of a concentration method (e.g., adsorption, absorption or membranes). The desorbate 421 generated by this is subsequently fed into a condensation device 410 that condenses the at least one pollutant and thus removes it from the desorbate 421. Accordingly, a purified exhaust gas stream 402 or 402' is provided by the concentration device 420 and the condensation device 410, respectively.

The concentration may be carried out, for example, by means of a bed adsorber or a rotor wheel concentrator (e.g., with zeolite and/or activated carbon).

Alternatively, the condensation may also be carried out without a previous concentration by the concentration device 420. As indicated in FIG. 4, the exhaust gas stream 401 to be purified may also be directly fed into the condensation device 410. For example, a pollutant of a dryer in the exhaust gas stream 401 to be purified may also be directly condensed by the condensation device 410 (a concentration of the pollutant in the exhaust gas stream 401 to be purified may, for example, be already carried out by a circulation air operation in the dryer itself).

Likewise, a condensation of the exhaust gas stream 401 to be purified with a subsequent adsorptive concentration of the residue may be carried out in the condensation device 410 in order to achieve the desired or required maximum pollutant content of the purified exhaust gas stream 402'.

As can be seen from the preceding explanations, the solvent recovery can be carried out using various approaches that can be chosen depending on the process requirements and the type of pollutant or pollutants, for example.

The solvents obtained in the condensation device 410 may be subsequently optionally treated in the solvent treatment device 430 and again fed into the production process or the production system 460. According to embodiments, the treatment may also be omitted. Alternatively, the recovered solvents may also be gathered and further processed externally (i.e., they are not directly fed again into the production process or the production system 460). The purified exhaust gas stream or exhaust gas streams 402 and 402' can be transmitted into the environment or again fed into the production process or the production system 460.

Data relating to the individual exhaust gas streams or solvent streams can be recorded via one or more sensors 440, 441, 442, 443 or 444. The measurement data of the sensors 440, 441, 442, 443 or 444 are sent as system data to a data cloud 450 by the exhaust gas purification system 400 and analyzed there according to the invention. Furthermore, as indicated in FIG. 4, data of one or more sensors 445, 447 of the industrial production system 460 may also be received by the data cloud 450 and included in the analysis. It is to be noted in this context that the sensors illustrated in FIG. 4 are chosen merely as examples and for illustration purposes. According to embodiments, also more, less or differently placed sensors may be used.

By means of suitable sensors or the recording of suitable parameters or characteristics, an analysis, evaluation or balancing of the entire system or selected sub-processes may be carried out via the data cloud 450. Since the exhaust air purification is aimed at recovery, a direct coupling of the exhaust gas purification system 400 to the production process is given.

Like in the preceding embodiments, sensor information may be evaluated or combined before and/or after a process step or a sub-step (volume flow, pressure, temperature, concentration—e.g., LEL concentration, humidity content, etc.) alone or together with information from the respective process in the data cloud 450 in order to determine one or more characterizing quantities of the exhaust gas purification system 400 and provide it for retrieval by a terminal device 470 of a user.

For the concentration sub-process, a concentration of one or more pollutants in the exhaust gas stream 401 to be purified, in the purified exhaust gas stream 402 or in the desorbate 421, for example, can be determined from the transmitted system data depending on the rotational speed of a adsorption wheel or depending on an inlet temperature of the exhaust gas stream 401 to be purified or the desorption temperature.

In the condensation sub-process, a switching time for a 2-line-condensation can be determined depending on the operating temperature and the gas properties at the inlet of the condensation device. "2-line" means a redundancy of the aggregates in this connection, as one line always freezes during condensation while the other line thaws. Likewise, indexes on individual condensation stages (e.g., temperatures) may be determined as characterizing quantity depending on the condensate composition. A condensation in several stages means in this connection that various enriched fractions are precipitated separately such as to facilitate a subsequent treatment. According to some embodiments, a respective pumping power for an individual condensation level for monitoring (balancing) individual fractions (e.g., amount of pumped condensate amount depending on input quantities) may also be determined as the characterizing quantity, for example.

Likewise, a balancing of the entire system (production and exhaust gas purification=solvent recovery) can be carried out in the data cloud 450 with regard to the solvent use or a tracking of an enrichment of solvents in a procedural step (in order to avoid the risk of condensation). Likewise, an electrical energy input per unit mass of recovered solvent may be used as characterizing quantity, for example.

Thus, an automated, efficient and targeted monitoring of the exhaust gas purification system may be carried out.

More detailed embodiments of monitored exhaust gas purification systems with solvent recovery will be described in the following in conjunction with FIGS. 5 to 10.

Figures 1, 5:
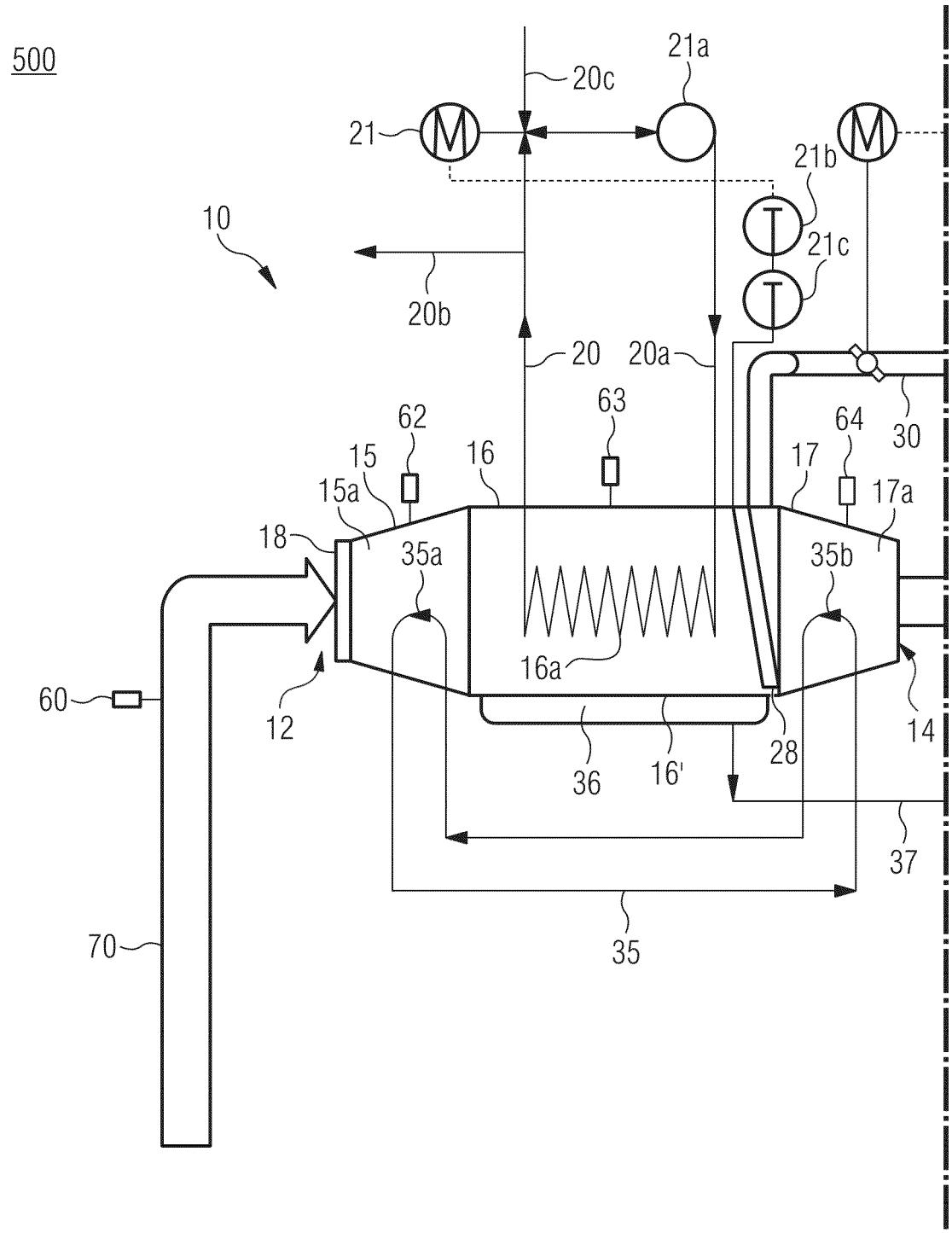
FIG. 5 illustrates an embodiment of a monitored exhaust gas purification system comprising a single-stage condenser and a downstream emission control apparatus.
Figures 2, 5:
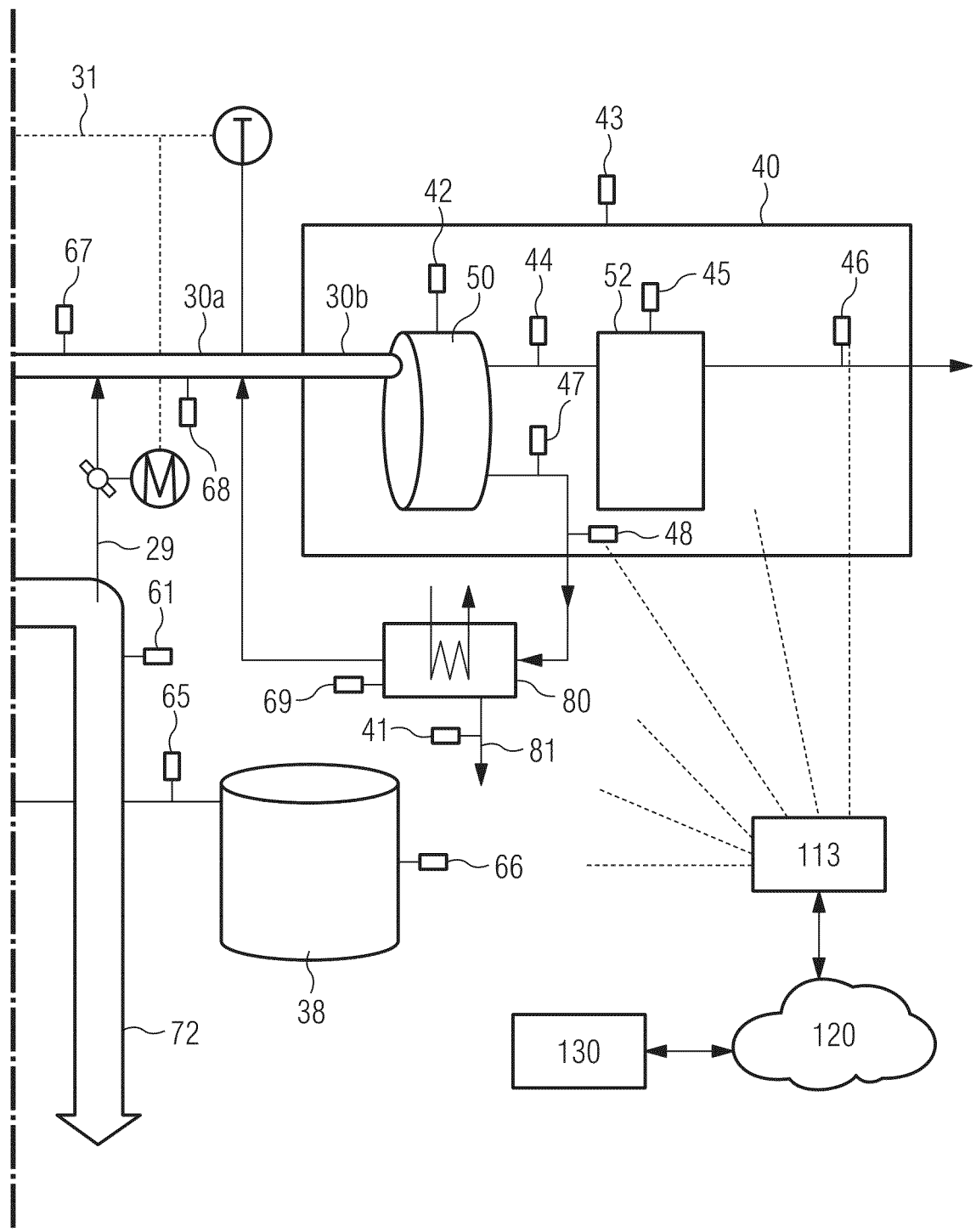
Figure 6:
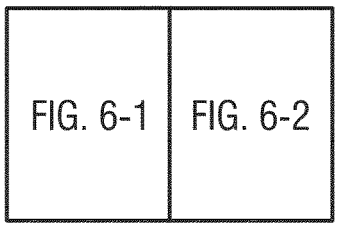
FIG. 6 illustrates an embodiment of a monitored exhaust gas purification system comprising a multi-stage condenser and downstream emission control apparatus.
Figure 1:
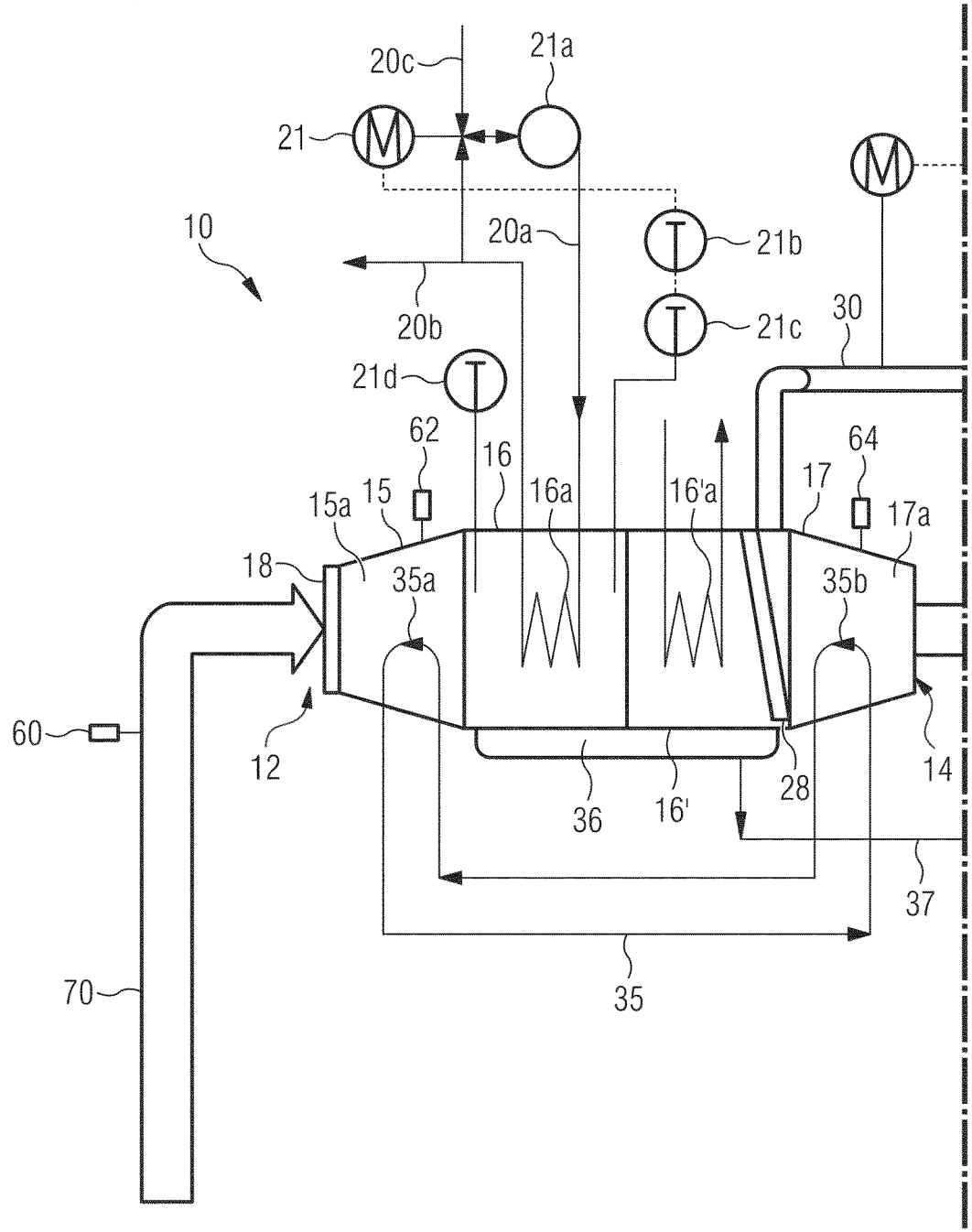
Figures 2, 6:
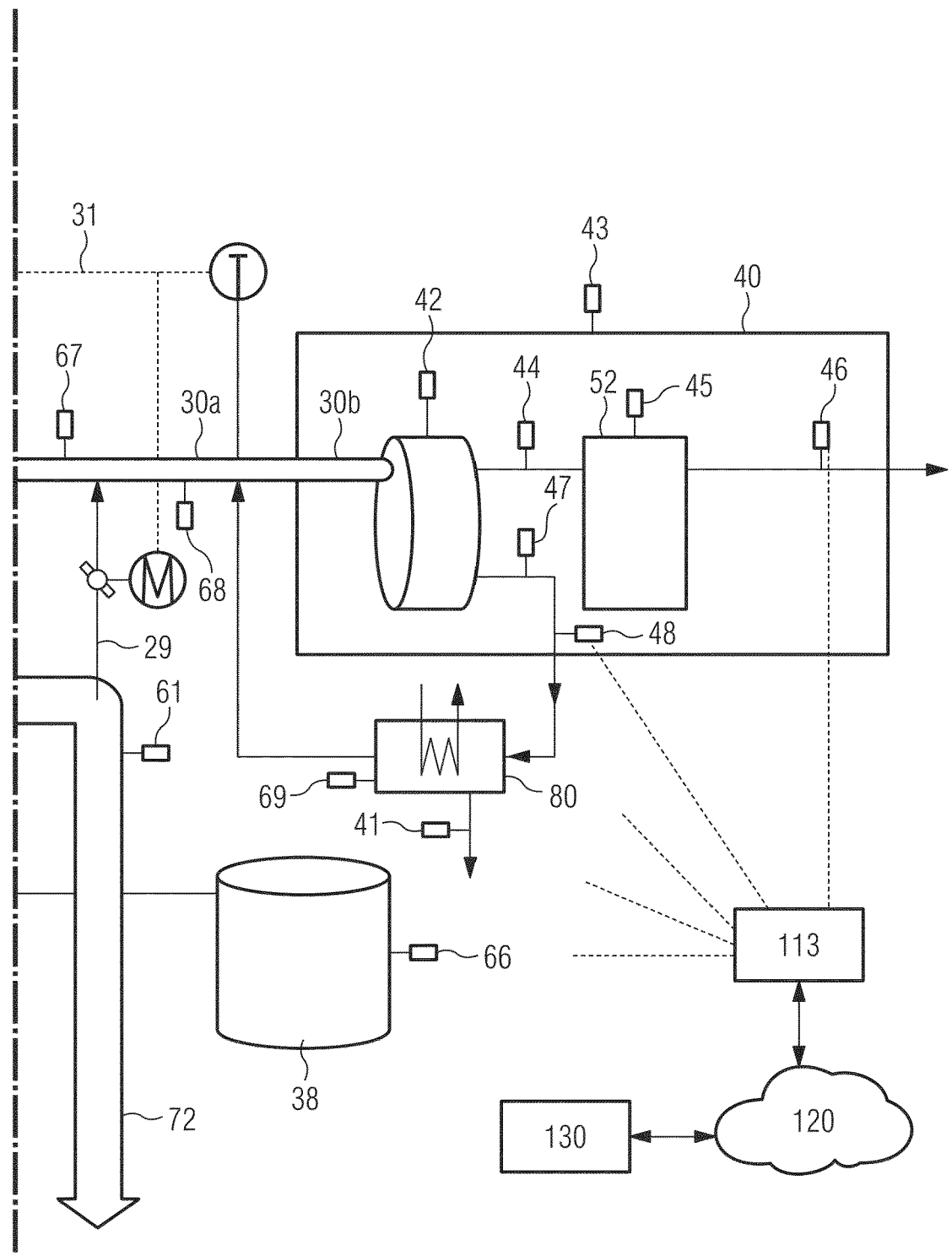

Turning now to FIG. 5 and FIG. 6, where like numerals indicate like parts, there is shown a exhaust gas purification system 500 comprising a condenser 10 having a feed port 12 (which may be understood as an inlet for an exhaust gas stream to be purified) and an exhaust port 14 (which may be understood as an outlet for releasing a purified exhaust gas stream) spaced from the feed port 12. In the embodiments shown, the entry of condenser 10 has optionally an air particulate removal filter 18, one or more pre-cooling regions 15, each having a pre-cooling chamber 15a; one or more cooling or condensing regions or stages 16, downstream of the one or more pre-cooling regions 15, each having a condensing chamber 16'; a mist coalescing panel (i.e., a demister) 28, and one or more re-heating regions 17, downstream of the one or more cooling or condensing regions 16, each having a re-heating chamber 17a. Each of the aforementioned chambers is accessible by or permeable for the circulation of air. In certain embodiments, the cooling or condensing region 16 may be a single stage condenser (FIG. 5), or may comprise multiple cooling stages (FIG. 6), each effective to further cool the entering gas stream to a temperature lower than the temperature to which the gas stream was cooled in the cooling stage immediately upstream of it.

In some embodiments, there are two coils 16a and 16'a in cooling or condensing region 16 (FIG. 6). In some embodiments, there are three, four, five or more condensing coils effectively creating multiple condensing stages or regions (not shown). The number of condensing regions depends in part on the properties of the VOCs and how gradual the VOC-laden process stream should be cooled to avoid fog formation; i.e., it is at least in part a function of the rate of temperature drop or temperature cooling profile of the VOCs.

In certain embodiments, each cooling or condensing region or stage 16 may include a condensation chamber 16' having a cooling coil 16a arranged therein, through which a cooling medium may be circulated. Suitable cooling media are not particularly limited, and include water and brines, such as water mixed with propylene and/or ethylene glycol. Each cooling coil 16a may be partially or completely arranged within its respective cooling or condensing region 16. As shown in FIG. 1, preferably the flow of cooling media through the cooling coil 16a is in a counter-flow direction to the flow of process gas through the condensation chamber 16'.

Alternatively, a spray condenser could be used where the coolant is sprayed in the condensation chamber by one or more nozzles to condense the VOC's in the process stream.

Figure 7:
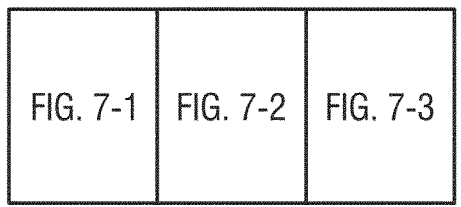
FIG. 7 illustrates a process diagram of a first exemplary solvent recovery process.
Figure 1:
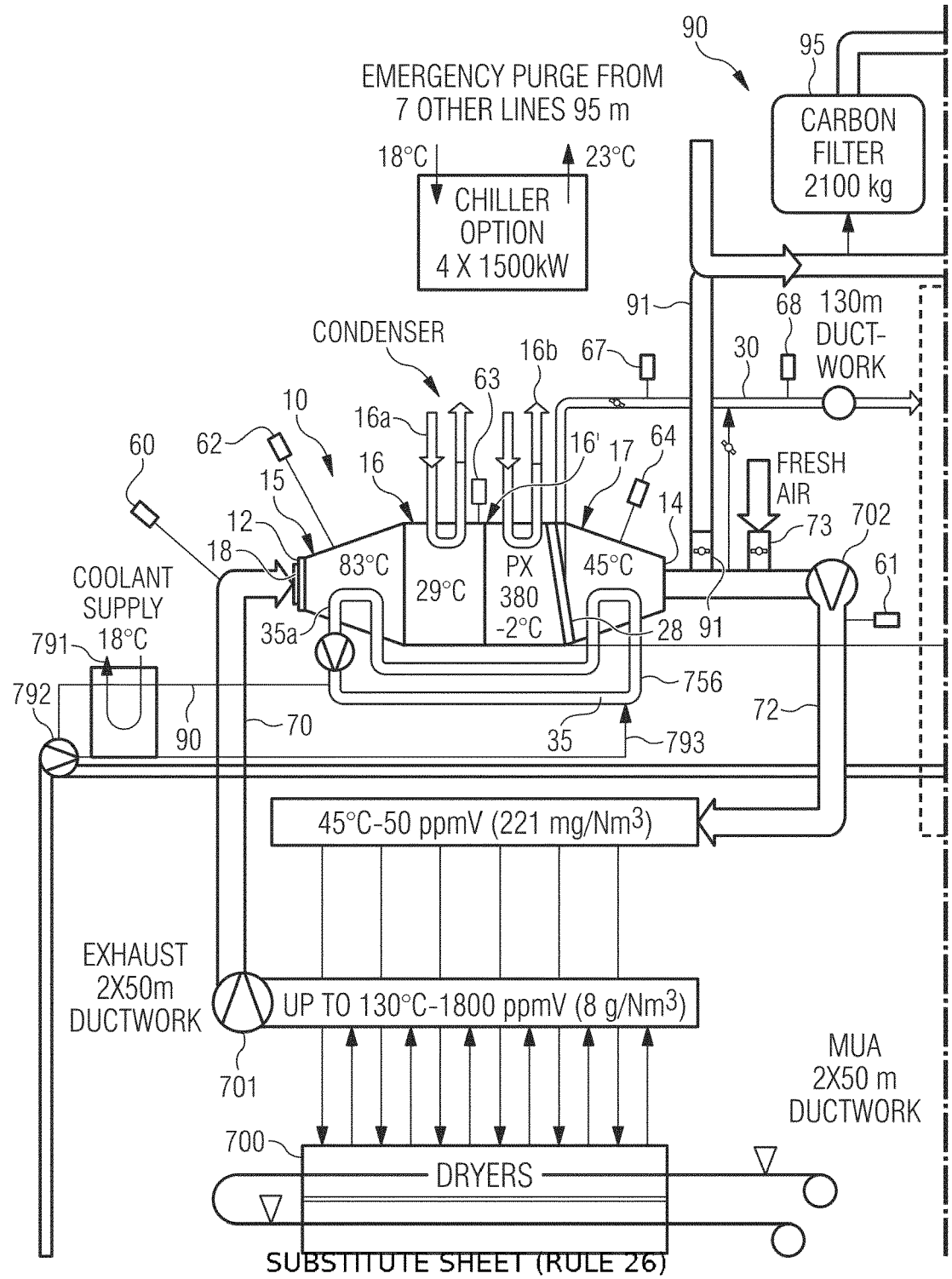
Figures 2, 7:
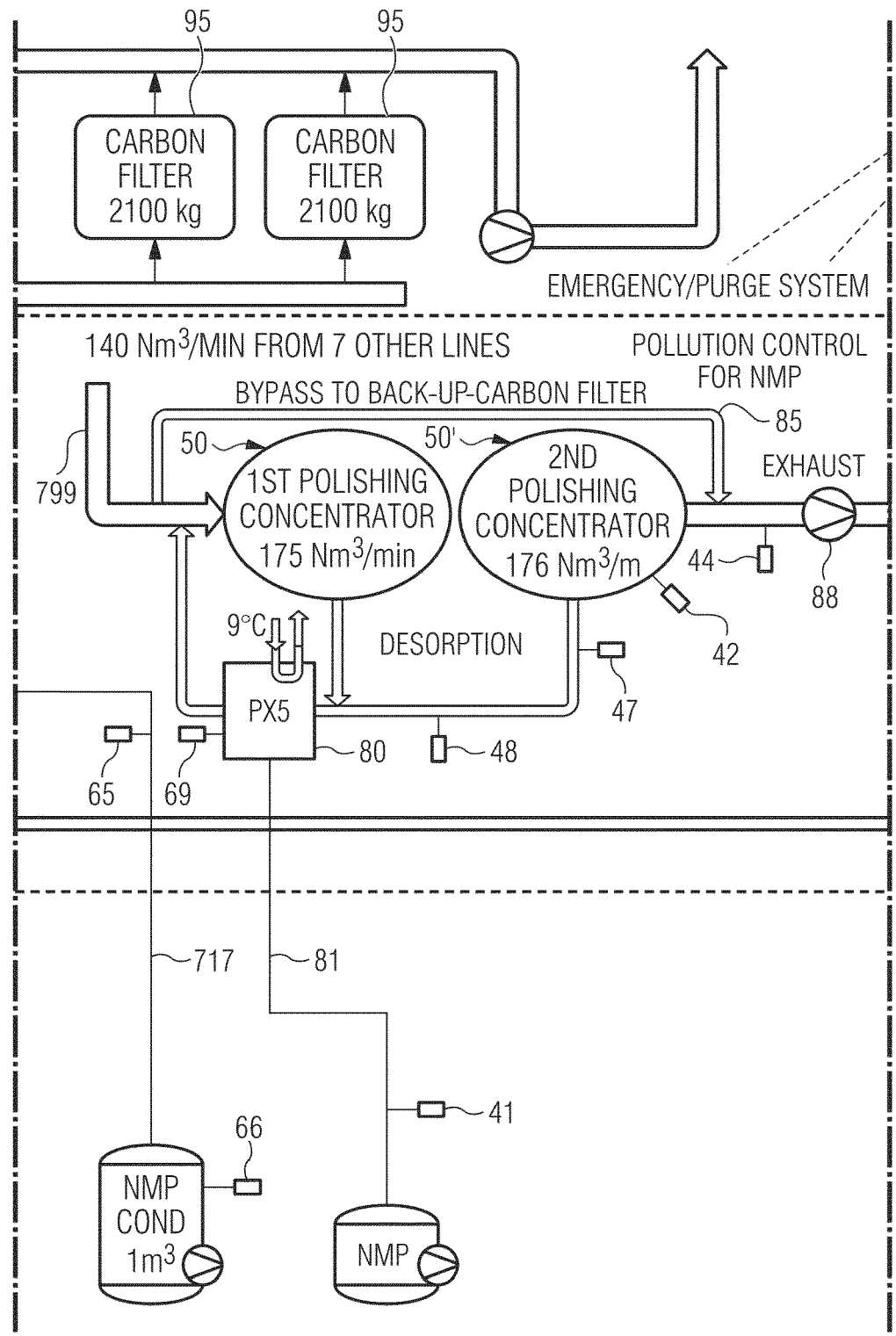
Figures 3, 7:
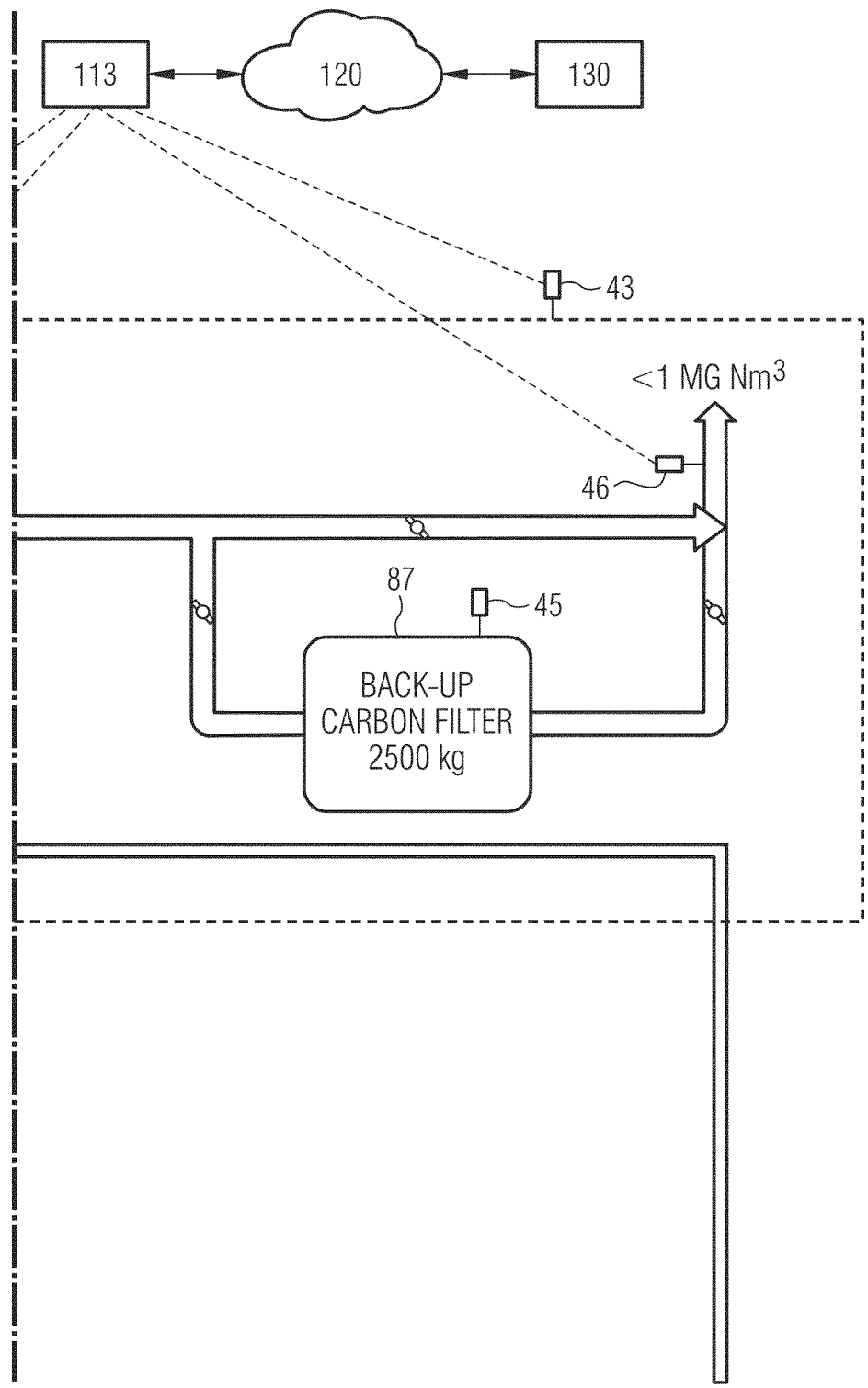
Figures 1, 8:
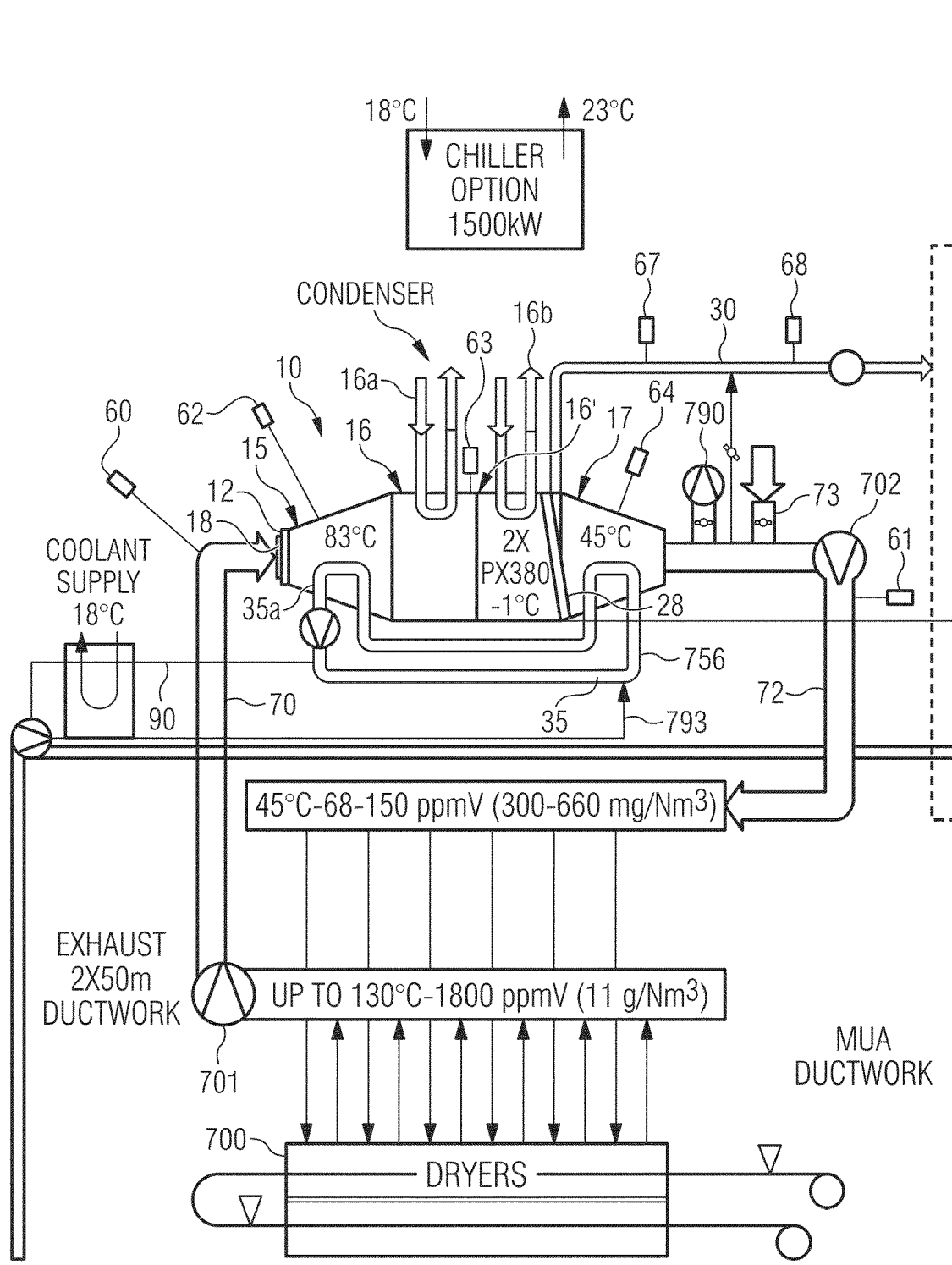
FIG. 8 illustrates a process diagram of a second exemplary solvent recovery process.
Figures 2, 8:
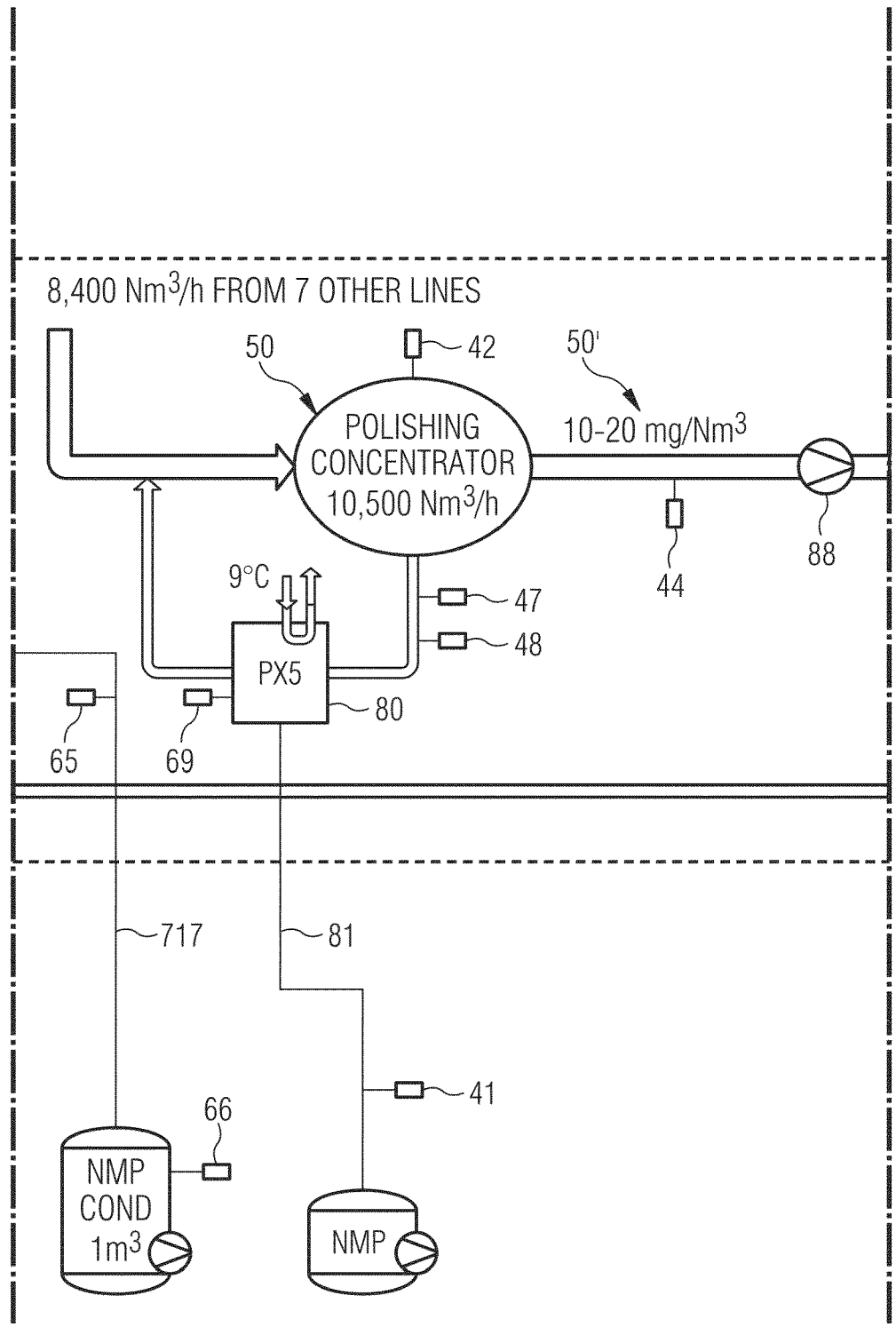
Figures 3, 8:
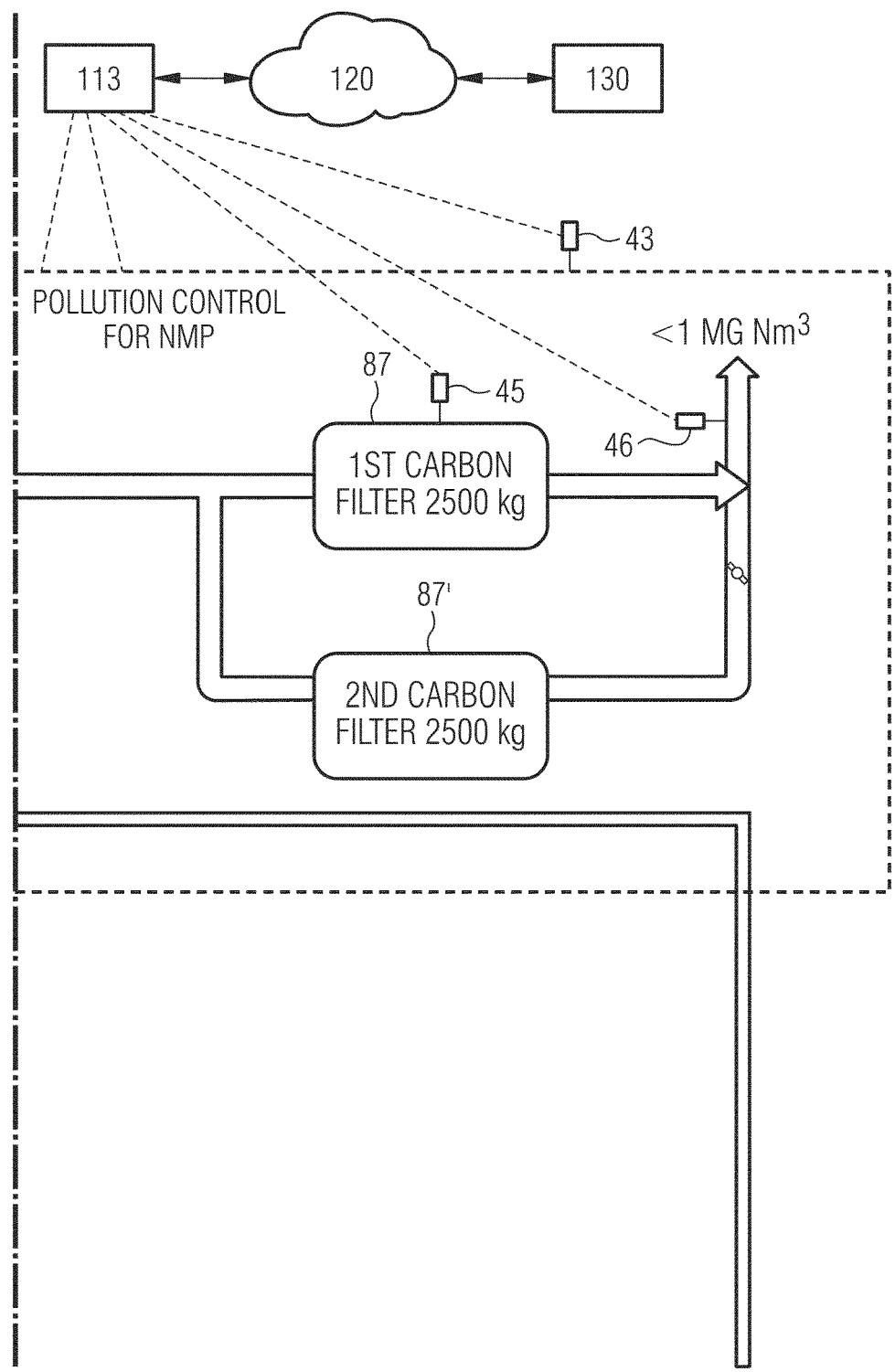
Figure 9:
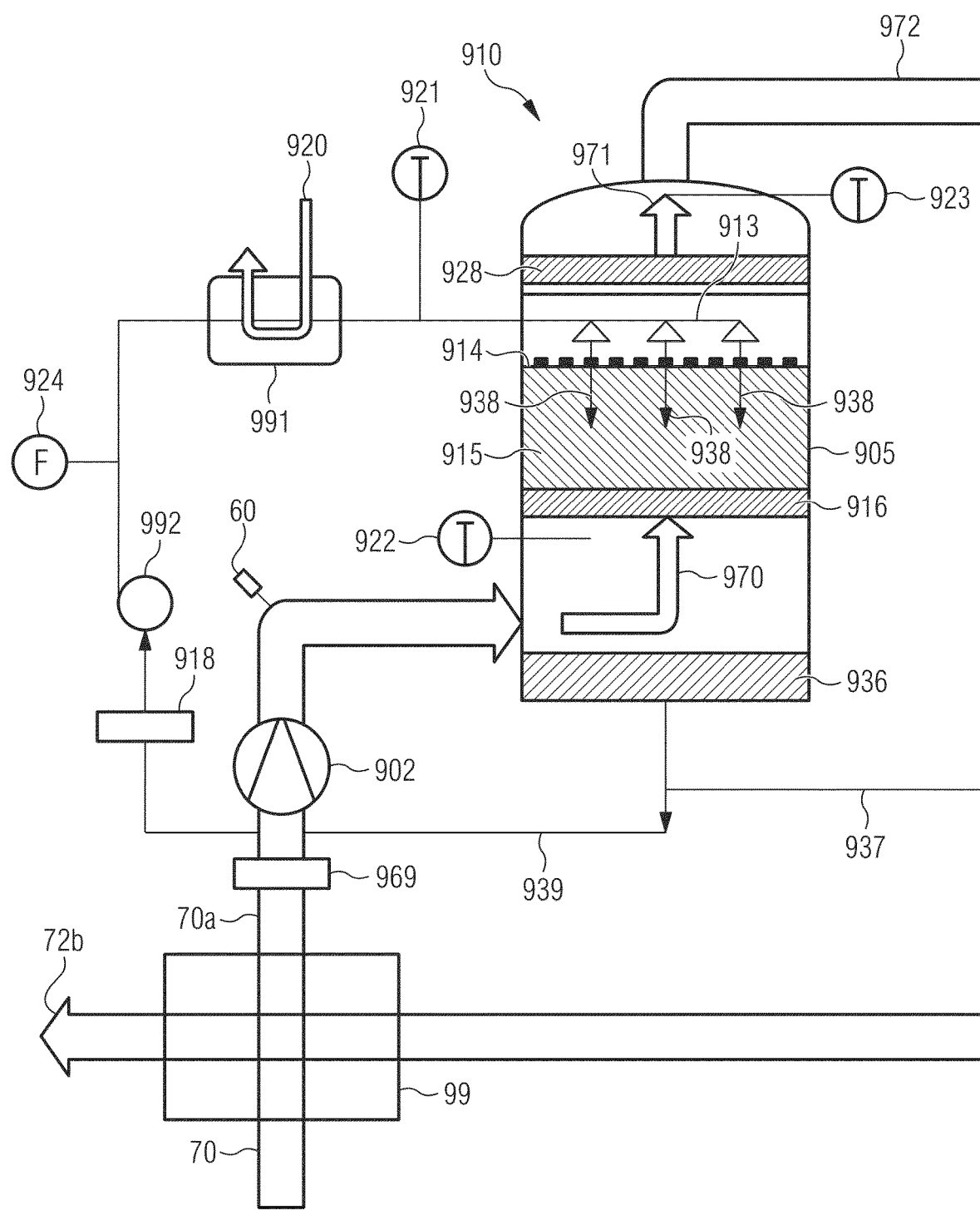
FIG. 9 illustrates an embodiment of a direct contact condenser operation.
Figure 1:
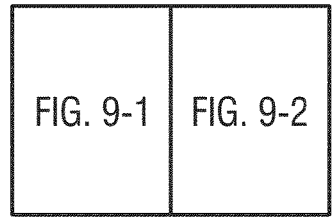
Figures 2, 9:
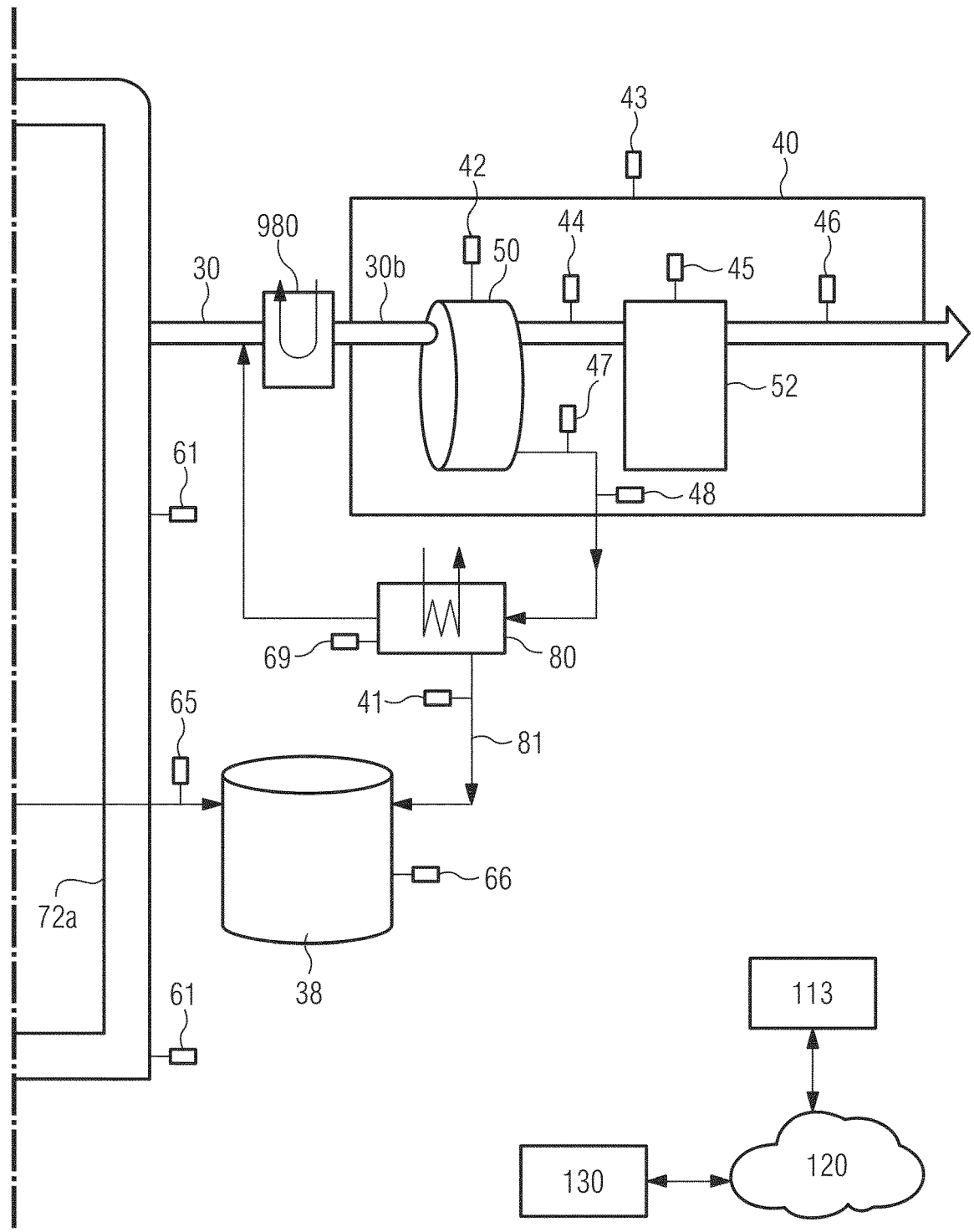

Alternatively still, as shown in FIG. 9, a direct-contact condenser 910 could be arranged in place of condenser 10 of FIGS. 5-8. Solvent-laden airflow 70 from a drying operation is directed to direct-contact condenser vessel 905 after precooling in economizer heat exchanger 99. The cooled stream 70a is optionally pre-filtered in air filter unit 969 and pressurized by blower 902 and blown into a port in the lower section of vessel 905. The solvent laden air 970 enters the lower chamber of 905 and is directed vertically through flow distributor 916 into a region of media packing 915. Flow distributor 916 includes structural elements to support the weight of the packing and weight of liquid adhering to the packing. Said packing may be selected for optimum surface contact area with the upward-flowing air stream per unit volume and for low pressure drop characteristics. Common packing shapes include Raschig rings, saddles, pall rings or other suitable packing shapes. The packing is generally of corrosion resistant material such as stainless steel, ceramic or polymeric materials. The solvent-laden air stream 970 passes through the packing media and directly contacts cooled condensed solvent flowing downward by gravity and wets the surfaces of the packing. Said cooled condensed solvent is fed to the upper portion of vessel 905 via flow distribution header 913 and may optionally be further distributed by fluid tray 914 to evenly distribute the cooled solvent evenly across the horizontal cross section at the top of the packing 915. Cooled solvent 938 is used directly as condensing media by direct contact between solvent laden air stream 970 and the wetted surfaces of the packing media in the packing contact region 915. The cooled solvent trickles downward through the packing picking up condensed solvent from the counter flowing air eventually reaching the bottom of packing region 915 and drains through distributor 916 into the lower section of vessel 905 acting as a sump. The level of collected solvent 936 in said sump is maintained by a level sensor and control which directs solvent through conduit 937 to primary storage vessel 38.

The exit gas flow 971 passes through a demister element 928 and a majority of the flow travels through exhaust line 72a and is reheated in economizer 10 before being conveyed in conduit 72 to the dryer operation. The split ratio of flow conducted in conduit 937 is preferably in the range of 0.5% to 10% of the flow in exhaust line 972. During unsteady state operating conditions this split ratio can be as high as 20%. The flow in conduit 30 is preferably reheated by heat exchanger 980 to obtain a temperature of flow 30b entering the concentrator 50 between 10° C. and 20° C., most preferably 15° C.

It is to be appreciated that for direct contact condensation, the cooling and condensation surface is in effect the cooled solvent liquid acting as the cooling media as well wetting the surface of the packing and trickling downward countercurrent to the solvent-laden airflow.

Having a lower vapor pressure than the solvent laden air, the cooled solvent picks up more solvent from the air as well as increasing in temperature from said air. Therefore, in continuous steady state operation energy must be removed from the condensed solvent stream 939 by liquid-liquid heat exchanger 991. The temperature of the cooled solvent fed into the direct condenser must be measured and precisely controlled prior to distributing the cooled solvent into vessel 905 via feed manifold 913. A majority of the collected solvent in 936 in the sump region of 905 is directed through conduit 939 and optionally filtered in liquid filter 918 and further pumped by centrifugal pump 992 and cooled through liquid-liquid heat exchanger 991 and further conveyed to distribution header 913 near the top the tower vessel 905. The split ratio of the flow in conduit 937 is in the range of 5% to 30% of the flow in conduit 939. The flow rate in 939 is measures with a suitable liquid flow meter and controlled to a set point by a controller modulating the speed of motorized pump 992 by variable frequency motor speed control. The temperature of the cooled solvent is measured as it enters the distributor manifold 913 by a suitable temperature element such as an RTD and controlled to a set point temperature, preferably in the range of −10 to 0° C., most preferably −4° C. by coolant brine source 920 in exchanger 991. An actuated flow control valve in the coolant flow conduit from brine source 920 is modulated to obtain a desired measured temperature feeding the distributor 913. Said temperature set point is sufficiently cool such that the vapor pressure of the solvent in the gas phase exiting the packing region 915 results in a concentration level of solvent in stream 971 in the range of 1 to 500 mg/Nm3, preferably 1 mg/NMP in the case of NMP.

Figures 1, 5A:
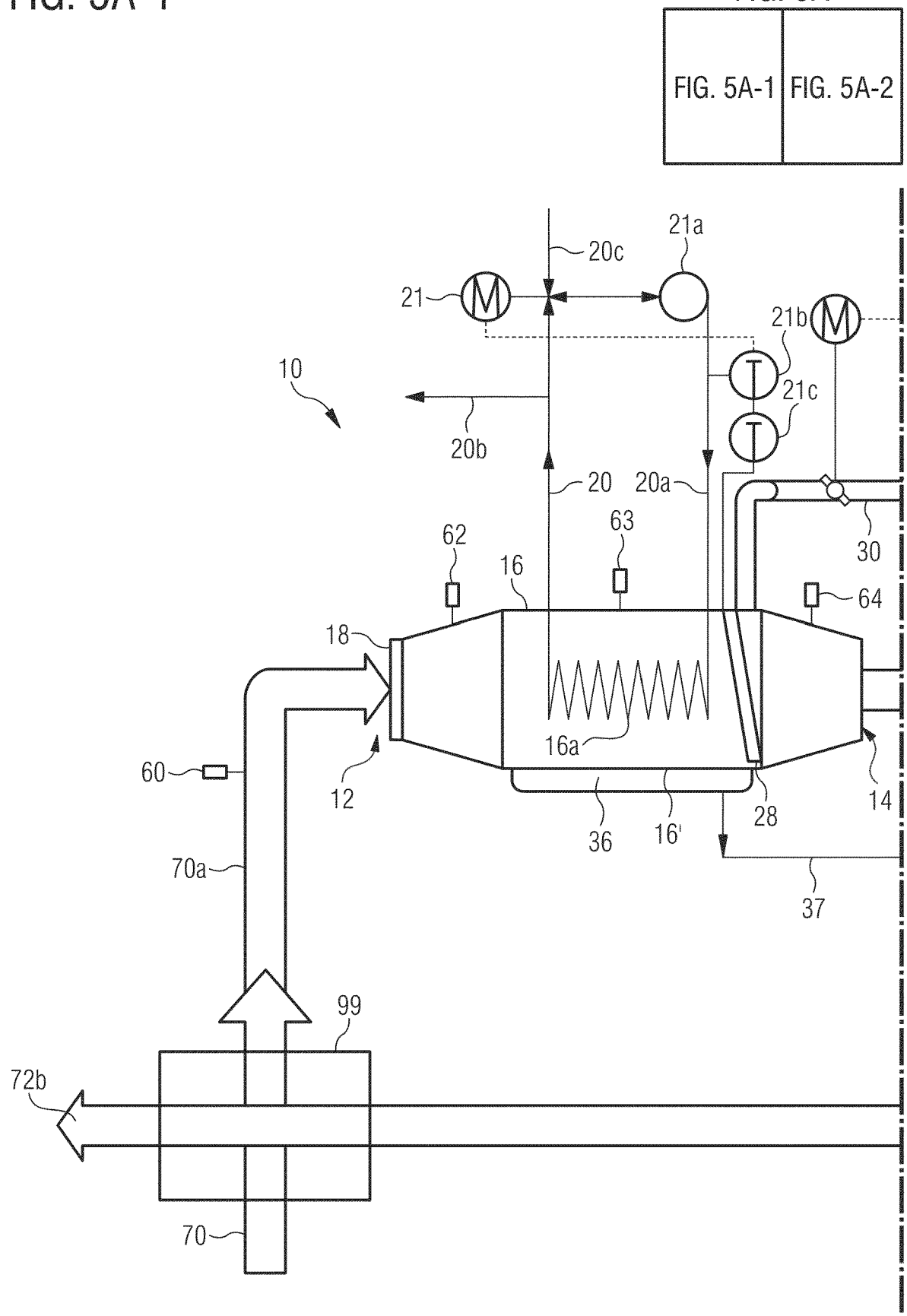
FIG. 5a illustrates an embodiment of a monitored exhaust gas purification system comprising a single-stage condenser, a downstream emission control apparatus and an air-to-air economizer.
Figures 2, 5A:
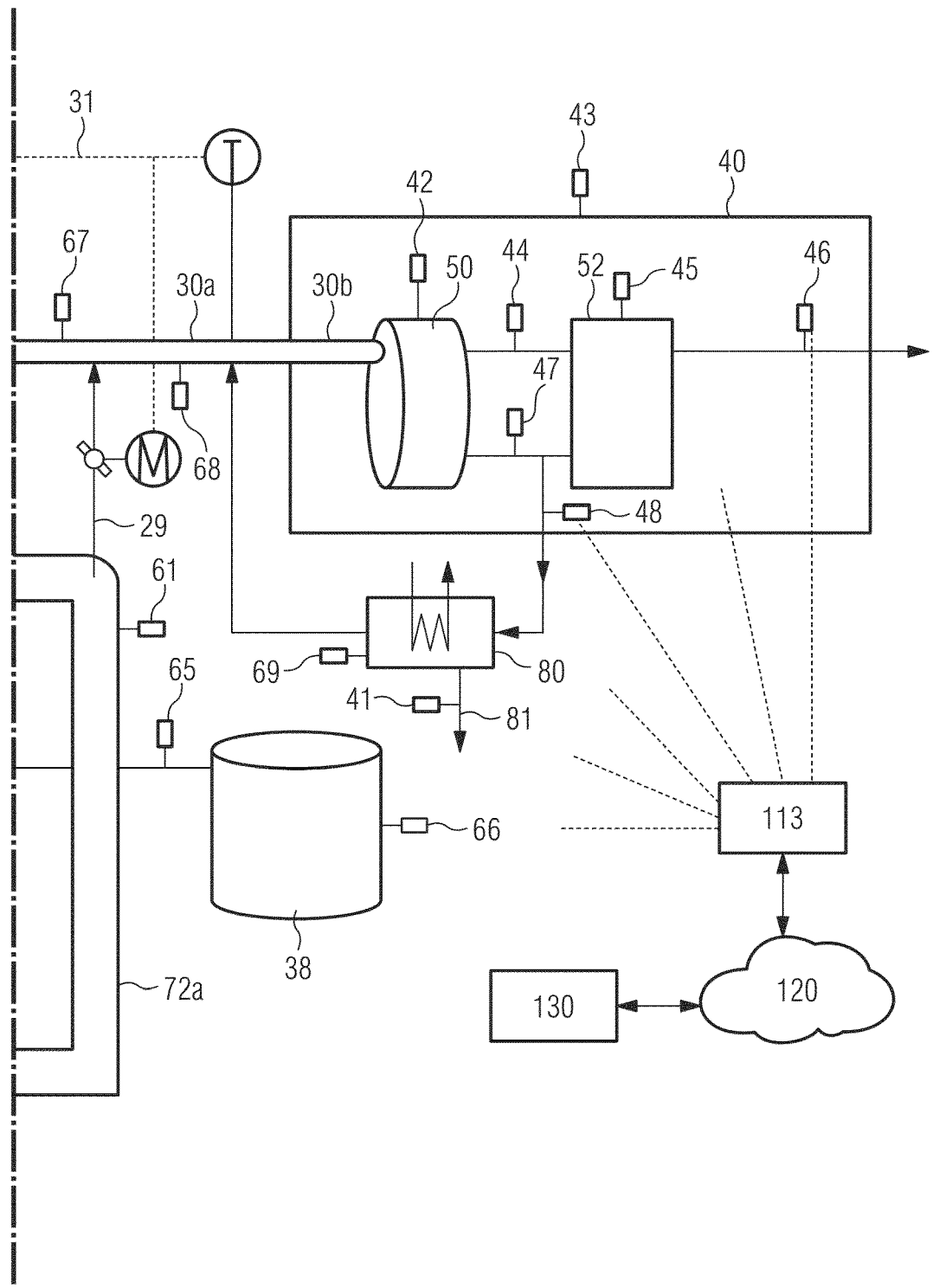

Turning again to FIG. 6, in certain embodiments, the pre-cooling region 15 and the re-heating region 17 may be brought and/or maintained at their respective operating temperatures with a pre-cooling heat exchanger and a re-heating heat exchanger. In certain embodiments, these heat exchangers are a closed loop heat exchange recirculation system 35 which may function as an economizer. The recirculation system 35 may include a first coil 35a at least partially arranged inside the pre-cooling chamber 15a and a second coil 35b at least partially arranged inside the pre-heating chamber 17a. The loop 35 may contain a suitable heat exchange medium such as water or brine to transfer heat to and/or from the process gas in the pre-cooling and pre-heating regions. An air-to-air economizer heat exchanger 99 also could be used as shown in FIG. 5a. Exhaust flow 70 from the drying operation is precooled in economizer 99 by the cooler temperature return air flow in exhaust line 72a. The economizer 99 is selected to provide thermal exchange effectiveness in the range of 40 to 60% resulting in temperature of flow 70a at the proper pre-cooled temperature value in the range of 80 to 100° C. Accordingly, the exhaust return air 72a is reheated with energy from exhaust 70 to a desired temperature in the range of 40 to 60° C. in the economizer 99. The temperature of the heat exchange medium optionally may be regulated with the aid of a further heat exchanger 791 as shown in FIG. 7. In certain embodiments, the temperature of the coolant in the recirculation loop 35 is higher than the temperature of the coolant in the coil or coils in the condensation region 16. Excess thermal energy may be removed to control the temperature of the coolant in recirculation loop 35 by circulating a portion of the coolant from loop 35 via pump 792 through a liquid-liquid heat exchanger 791, in a split ratio range of 10 to 50% of the flow through 35. The portion of fluid thus cooled is returned in conduit 293 to 35 before entering 35b.

In certain embodiments, the pre-cooling region 15 and the condenser region 16 have a common housing. In certain embodiments, the condenser region 16 and the re-heating region 17 have a common housing. In certain embodiments, the pre-cooling region 15, the condenser region 16 and the pre-heating region 17 have a common housing.

In some embodiments, a pre-cooling heat exchanger 35a may be arranged upstream of the pre-cooling region to reduce the temperature of the streaming in circulation air. In some embodiments, a re-heating heat exchanger 35b may be arranged downstream of the condensation region 16. In some embodiments, both heat exchangers may be so arranged. The pre-cooling heat exchanger and the re-heating heat exchanger may be thermally coupled by the exchange of a heat transfer medium such as water, brine or suitable thermal fluid.

In certain embodiments, a side-stream off gas extraction line 30 may be provided in fluid communication with the condensation region 16. Where multiple condensation regions 16 are provided, the side-stream off gas extraction line is preferably in direct fluid communication with the furthest downstream condensation chamber 16a, i.e., the chamber immediately upstream of the re-heating region 17. The side-stream gas extraction line 30 may be configured to communicate with a downstream unit operation, such as one or more VOC concentrators and/or one or more emission control units as discussed in greater detail below.

A portion of side-stream off-gas may also be extracted following the re-heating region through conduit 29 and added to the side-stream flowing in extraction line 30. Temperature control loop 31 comprised of a temperature sensor and controller positioned to measure the mix temperature of flows from extraction lines 29 and 30 and modulate actuated flow dampers in flow lines 29 and 30. Thus an optimum temperature in the range of 10 to 18° C., preferably 15° C. may be obtained and controlled by closed-loop control of flow proportioning as the flow 30b enters the concentrator 50. A circulation air exhaust line 72 may be provided in fluid communication with the exhaust port 14 of the condenser 10. The circulation air exhaust line 72 may be configured to connect to a feed circulation air duct of one or more industrial dryers (FIG. 7), for example. The split flow proportion flowing in conduit 30a is preferably in the range of 0.5% to 10% of the flow in exhaust line 72. During unsteady state operating conditions this split ratio can be as high as 20%.

In some embodiments, the feed port 12 of the condenser 10 is in fluid communication with, or is adapted or configured to be in fluid communication with, the exhaust from one or more industrial dryers 700 (FIG. 7), such as by a circulation air feed line 70. That is, the source of the process gas to the condenser 10 may be the exhaust from one or more industrial dryers, such as one or more dryers drying coating on a web. For example, in battery electrode manufacturing, a wet process is used to apply battery electrode components to a current collector web of copper or aluminum foil, for example. Typically, a polymer binder, graphite, and an active material are mixed with a solvent, or water, and applied to a web. The solvent or water is driven off in one or more dryers to produce a dry battery electrode material for use in a battery cell. The exhaust from such a dryer or dryers is a suitable feed stream to the condenser 10.

In some embodiments, the exhaust port 14 of the condenser 10 is in fluid communication, or is adapted or configured to be in fluid communication, with a recirculation feed to one or more industrial dryers 700 (FIG. 7), such as by a circulation air exhaust line 72. A suitable driving force, such as a suction fan arranged in the recirculation line 72, may be used to drive the flow of process gas into and through the condenser 10.

The dryer or dryers 700 may be a conventional convection air web dryer such as where hot air is used to dry a coating on a web travelling through the dryer. For example, air bars or nozzles may be used to direct a jet of air to impinge on the surface of a material to carry out heat and/or mass transfer functions. Convection air drying of battery electrode materials is typically carried out with drying air temperatures in the range of 80 to 160° C. and air nozzle convection heat transfer coefficients to the web from 30 to 100 watts/$m^{2o}$ C. per side of web.

As is known to those skilled in the art, a plurality of air nozzles may be arranged in an array or multiple arrays to direct air impingement over a large surface of a material in web form, either on one side of the web, or both sides simultaneously. In some embodiments, the heat transfer to the web may be enhanced by addition of infrared emitters or emitting surfaces. Optimum temperatures for said emitting surfaces are in the range of 260 to 425° C.

Web materials commonly processed in this manner include paper, plastic film, metal foils, woven and non-woven fabrics and mats, and porous membrane materials. Flotation air bars are a type of air nozzle used in industrial dryers and ovens to floatingly support and convey a continuous web to be processed by thermal treatment, which may include any combination of drying, heating, curing or cooling of the web. A coating is applied to the surface of the web or a volatile material is present within the base web material which must be dried and/or heated to a particular temperature so as to facilitate thermal curing of a polymer material in the coating. In many processes the volatilized materials within the web or coating after being liberated from the web surface are carried away from that surface by the spent nozzle air and conducted by an air handling system to an exhaust. This exhaust is then directed into the condenser 10 in accordance with certain embodiments.

Alternatively, the dryer may be a so-called "inert" dryer, in which the dryer interior contains an inerting gas such as nitrogen in order to limit the oxygen content (e.g., to 2% or less) of the dryer atmosphere to, for example, reduce the possibility of explosion. Said nitrogen may be vaporized from liquid nitrogen storage tanks or produced continuously from nitrogen generator systems having membrane separators or pressure swing adsorption modules.

Recovered condensate may be removed from the condenser 10 and stored in a suitable container 38. Each condensing stage 16 and 16' and coalescing demister 28 are configured to drain condensed solvent by gravity to sump basin 36. Drain line 37 includes an air lock (strap or other suitable device) to prevent passage of air from condenser 10 to container 38 and vice versa.

In certain embodiments, the pre-heating stage(s) 15 of the condenser 10 functions as a pre-condenser; it is operated at a suitable temperature (and/or pressure) such that little or no VOC's condense as the process gas flows through the one or more pre-heating chambers 15a.

Most preferably the cooling coil 16a in the condenser stage 16 is operated so that the gas exiting condenser chamber 16' has a main temperature of 0° C. or less. In some embodiments, where multiple condenser stages 16 are used, the cooling coil arranged in the stage furthest downstream is operated such that the chamber in which it is arranged has an exit temperature of 0° C. or less, such as at 0° C., −1° C., −2° C., −3° C., −4° C., −5° C., or down to −20° C. in cases where the anti-freeze behavior due to solvent in the solvent-water mix is favorable against freezing and ice formation in the condensing coil. For such low temperature condensing it is especially important the cooling coil(s) be arranged in the one or more upstream condenser stages and operated such that their respective chambers have higher temperatures such that only a small portion of the VOC's in the upstream stages are condensed.

It is a goal of each condenser coil design and operating condition to maximize condensation with wetting of solvent on the tube and finned surfaces to promote capture and gravity drainage. Rapid cooling of the solvent laden air below equilibrium vapor pressure of the solvent promotes the formation of tiny droplets within the bulk air stream as it travels between condensing coil tube and finned surface. After nucleation, said tiny droplets tend to remain very small with negligible further condensation and growth owing to the Kelvin effect. Accordingly, in order to reduce or eliminate deleterious fogging, in certain embodiments the rate of cooling is carefully controlled so as not to cool the VOC-laden stream too rapidly. Fogging, or the formation of very small droplets (generally on the order of 1 micron or less) of liquid, is problematic in that it involves the formation of tiny droplets that tend to become entrained in the air flow, thus hindering their removal or recovery. Indeed, a significant fraction of such aerosol droplets pass through demister panels as well as pass through the core of the condenser coil. As a result, fog or aerosol formation results in the undesirable loss of product. In embodiments where the VOC includes NMP such as in lithium battery electrode production, for example, these tiny droplets of NMP end up being returned to the dryer(s), which is highly undesirable. Accordingly, the pre-cooling region(s) 15 and the condensation region(s) 16 should be operated such that gradual cooling of the process stream takes place so as to avoid fog formation.

For purposes of cooling rate characterization and quantification, the residence time of the solvent laden air while within the core of a particular condensing coil (i.e. while undergoing cooling) is made on a superficial volume basis. That is, the volume space occupied by the tubes and fins within the overall dimensions of the core is ignored in calculating the superficial residence time. The specific volumetric airflow Q through the coil is expressed in normal cubic meters per unit time. The coil face area and depth in the flow direction are used to calculate the volume V in cubic meters. Therefore, the superficial residence time in the core is determined as $t=V/Q$. Further, the temperature drop DT in Centigrade degrees (note this parameter is a temperature difference value, not an absolute temperature value) of the air and solvent driven by the cooling coil may be measured directly in operation or calculated from supplier sizing data in the design phase. Finally, the rate of cooling R may be expressed as $R=DT/t$. For example, a cooling coil core has a face area of 4.5 square meters and a flow path depth of 0.3 meters. The specific volumetric airflow is 25,000 $Nm^3/h$. Therefore, the residence time may be calculated as t=(4.5×

0.3) m³/25,000 m³/hr=5.4×10⁻⁵ hr. Converting to milliseconds t=5.4×10⁻⁵ hr×3,600,000 millisec/hr=194 milliseconds. If the air temperature entering the coil is 56° C. and the exiting temperature is 28° C. the cooling rate R=DT/t=(56° C.–28° C.)/194=0.144° C. per millisecond.

For NMP capture with minimal fog formation in the condensing coil regions where condensation of solvent is occurring while the gas flow travels the distance between the condensing coil tubes and finned surfaces, the rate of cooling should be less than 0.30° C. per millisecond, preferably between 0.15 and 0.22° C. per millisecond. Typical design criteria for organic solvents such as DMAc with water vapor for minimal fog formation in the condensing coil regions where condensation of solvent is occurring while the gas flow travels the distance between the condensing coil tubes and finned surfaces the rate of cooling should be less than 0.3° C. per millisecond, preferably between 0.12 and 0.2° C. per millisecond. In most cases the acceptable maximum cooling rates for a particular solvent must be determined by experiment.

In operation the method of precise control of the cooling rate may be illustrated in reference to FIG. 2 for exemplary case of coil 16a. This same method is applicable to a plurality of cooling coils represented as 16b within a condensing plenum 10. It is to be understood that the circulating flow loop and controls described below shall apply to additional coils in like manner. All such flow loops shall include the temperature control circuits and hardware shown for coil 16a.

The flow and temperature of the cooling medium 20a entering the coil 16a are preferably measured with a suitable flow meter device and temperature sensor such as a resistance temperature detector (RTD) respectively. The circulating flow is driven by a fluid pump 21a in communication with the fluid entry connection of the cooling coil 16a. Further, the temperature of the air entering the cooling coil is preferably measured with an array of one or more temperature sensors 21d spaced across the cross-section of the entry face of the coil and the temperature of the air exiting the cooling coil is preferably measured with an array of one or more temperature sensors 21c spaced across the cross-section of the exit face of the coil. Said air temperature sensors may be RTDs or thermocouples. The temperature of the entering cooling media is measured and controlled to a pre-determined set point by a suitable sensor and Proportional-Integral-Derivative (PID) controller 21b in control communication with a valve and actuator 21 positioned in the conduit 20c from the chilled brine source, typically a water-cooled or air-cooled centrifugal chiller. An actuated three-way flow path valve 21 allows fresh cooling media from the cooling media source 20c to enter the circulating flow path through the coil while heated cooling media in fluid communication with the cooling media return connection 20b is discharged back to the cooling media source. Alternatively, the temperature of the air exiting the cooling coil is controlled to a pre-determined set point by a second suitable PID controller 21c in control communication with a valve and actuator 21 positioned in the conduit from the chilled brine source. In a most preferred embodiment, the output from said exit air temperature measurement and controller 21c is configured to calculate by control algorithm and transmit in a cascade control arrangement said temperature set point to the entering cooling media control loop 21b.

In certain embodiments, once the process gas flow from the condenser region 16 has reached 0° C. or less and VOC condensation is complete or substantially complete, the gas flow is divided into a relatively high volume recirculation gas flow (e.g., line 72) and a relatively low volume off-gas side stream (e.g., extraction line 30). In the example shown in FIG. 7, those volumes are split by a split-ratio of approximately 2%.

In certain embodiments, the blend of off-gas side stream extraction lines 29 and 30 combining into 30a is adapted or configured to be placed in fluid communication with one or more downstream emission control operations 40. For example, the emission control operation may include at least one adsorptive concentrator with a gas exhaust and a desorption exhaust, such as one or more VOC adsorptive concentrators 50 used to concentrate the VOCs extracted by the condenser 10. The type of VOC concentrator(s) used is not particularly limited, and may be rotation type gas adsorption concentration devices. For example, honeycomb rotors may be used to support the VOC adsorbent media, and the rotor may be divided into at least an adsorption zone and a desorption zone. The solvent-laden air to be processed is passed through the adsorption zone, where the VOCs are adsorbed by the adsorbent media (e.g., zeolite). The VOC's can then be desorbed, such as by-passing heated air through the desorption zone. In some cases, such concentrators may include a rotor wheel having an adsorbent substrate such as a hydrophobic zeolite, or a combination of adsorbents. The rotor wheel may be rotated continuously, and the airstream passes through the rotor wheel concentrator where VOCs are stripped from the air and adsorbed onto the adsorbent substrate. The majority of this now clean air may then be exhausted to atmosphere. A small portion of the air stream may be heated to an elevated temperature to be used as desorption air. Continuous rotation of the wheel transports this air stream to the desorption region, where the VOCs are heated, desorbed and collected. Purge air may be used to cool the adsorbent media, and the now heated purge air can be recycled to the desorption region. Thus, the one or more adsorptive concentrator 50 may have a gas exhaust and a desorption exhaust and function as an emission or pollution control stage.

In certain embodiments, a single VOC concentrator 50 may be used. In other embodiments, two or more VOC concentrators 50 may be used, arranged in series. In some embodiments, one or more further emission or pollution control stages 52 may be used downstream of the one or more VOC concentrators 50, such as one or more filtration devices (e.g., activated carbon based filtration devices), absorptive concentrators, thermal oxidizers (e.g., regenerative thermal oxidizers), catalytic oxidizers and/or biofilters.

In some embodiments, a two-stage air pollution control unit 500 as shown in FIG. 6 may be arranged downstream of the condenser 10, such as the pollution control unit disclosed in JP 2011-031159. The unit includes an organic solvent recovering device wherein an adsorbing body comprising an adsorbing element containing an adsorbent is constituted of at least an adsorbing region, a regeneration region and a cooling region. The organic solvent-containing gas (e.g., the gas in the side-stream 30 from the concentrator 10) is continuously supplied to the adsorbing region of the adsorbing body, the adsorbing element adsorbing the organic solvent in the adsorbing region, and is sent to the regeneration region to desorb the adsorbed organic solvent from the adsorbing element by a heated gas. The organic solvent-containing gas is again adsorbed in the adsorbing region by the regenerated adsorbing element, and a condensing part for recovering the organic solvent desorbed in the regeneration region is provided. A backup treatment device capable of performing continuous adsorbing and desorbing treatment of the organic solvent-containing treated gas passed through the adsorbing region without being adsorbed is provided, and is constituted so that the continuous solvent adsorbing and desorbing treatment is performed in the adsorbing region and the regeneration region by the adsorbing element formed into a columnar or cylindrical shape.

FIGS. 7 and 8 illustrate exemplary embodiments of the operation of a condenser and emission control apparatus. In an exemplary embodiment as shown in FIG. 7, an exhaust gas stream 70 containing VOC's, such as NMP, that is exiting one or more dryers 700 may have a temperature generally between about 80-130° C., more typically between about 120-130° C., and may have a solvent concentration generally between about 500-3000 ppmV, more typically between about 1800-2500 ppmV. In the embodiment shown, the concentration of solvent in the exhaust stream is 1800 ppmV and the temperature is 130° C. A driving force such as a fan 701 may be used to cause the exhaust stream to enter the feed port 12 of a condenser 10. Alternatively, or in addition, a suction fan 702 may be placed downstream of the condenser exhaust port 14.

Consistent with the objective of gradually reducing the temperature of the exhaust gas stream, it first enters a pre-cooling region 15 of the condenser 10, the region 15 having a coil 35a with a cooling medium having a temperature sufficient to lower the temperature of the gas stream to about 83° C. The residence time of the gas stream in the pre-cooling region should be sufficient to allow the temperature of the stream to cool to the desired value, such as 83° C. Since no condensation is occurring in this stage, cooling rates in the range of 0.6° C. per millisecond or more are acceptable. Preferably the conditions in the pre-cooling region 15 are such that little or no solvent condensation occurs. The gas then flows into a first cooling or condensing stage 16, where it is cooled by a coil 16a containing a cooling medium having a temperature sufficient (e. g., 18° C.) to lower the temperature of the gas steam to 29° C. In this stage most of the heat exchange is sensible heat and although little condensation of solvent occurs in this stage the cooling rate is critical in this early stage of condensing solvent. Cooling rates not to exceed the range of 0.15 to 0.30° C. per millisecond are preferred. The cooled gas then flows into a second cooling or condensing stage 16', or main condensing stage, equipped with a coil 16b containing a cooling medium having a temperature sufficient (e.g., −10° C.) to lower the temperature of the gas stream to equal to or less than 0° C.; e.g., −2° C., where significant phase change occurs, and all or substantially all of the remaining solvent condenses. Again, in this stage the cooling rate is critical as in this early stage of condensing solvent. Cooling rates not to exceed the range of 0.15 to 0.30° C. per millisecond are preferred. This gradual cooling of the gas stream helps minimize or prevent deleterious fog formation. In addition, causing the cooling fluid in the coils 16a, 16b to flow from the downstream side to the upstream side (i.e., in the direction opposite to the direction depicted in FIG. 7) can reduce fog formation.

A major portion of the gas then flows into the re-heating region 17, which in the embodiment shown has a coil 35b containing a cooling medium having a temperature sufficient to raise the temperature of the gas stream to 45° C., after which it is recirculated to the one or more dryers 700 via exhaust line 72. Ambient air may be added to the exhaust line 72 as shown at 73.

A minor portion (e.g., by mass flow balance equivalent to the flow of gas entering into web slots in the one or more dryers) of the gas flow is extracted from the cooling or condensing stage 16' via a side-stream off gas extraction line 30. In the example shown in FIG. 8, the volumes of the re-circulation air stream and the off-gas side-stream are split by a split-ratio of approximately 1.1%. It is preferred that this extraction be carried out upstream of the pre-heating region 17, since the relatively low temperature of this extracted stream raises the efficiency of a downstream concentrator. A portion of the gas in the re-heating region 17 may be extracted in conduit 29 and mixed with the gas in the side-stream off gas extraction line 30 extracted from the second cooling or condensing region 16'. The amount of gas that has been re-heated in region 17 that is mixed with the gas in the side-stream off gas extraction line can be blended with temperature controller and damper system 31 to regulate the temperature of the gas entering a downstream concentrator (or other downstream emission control apparatus) to optimize the performance of the downstream unit, such as regulating the gas in the side-stream off gas extraction line 30 to a temperature of about 10-20° C., preferably about 16-18° C. NMP can be recovered from the condenser 10 via line 717 and stored as shown.

Thus, the condenser apparatus 10 can be used to produce a feed stream to a downstream emission control unit or units, such as one or more VOC concentrators, the feed stream being at an optimum temperature for the performance of the emission control unit or units. Off-gas side stream flows extracted from a plurality of condenser apparatuses equivalent to condenser apparatus 10 may be preferably combined in common duct 799 and fed to a single VOC polishing concentrator system as shown in in FIGS. 7 and 8. This allows for better capacity matching of the side stream flows from a large operation having for instance 8 or more condensing apparatuses. Combination of the off-gas side stream flows results in improved economy of scale for the VOC polishing operation.

The gas in the side-stream off gas extraction line enters a first VOC polishing concentrator 50 which contains an adsorbent such as a zeolite or carbon. This first concentrator 50 typically removes from about 90 to 99% of the VOC's (e.g., NMP) from the gas stream. The adsorbed VOCs may be then desorbed by reheating, and may be directed to a cooling or desorbant condenser 80 or the like and recirculated back to the inlet stream to the first VOC polishing concentrator as shown. VOC condensate may be collected from the condenser 80 via line 81 and stored or recycled to the coating process.

In the embodiment shown, the concentrated gas stream next enters a second VOC polishing concentrator 50', which also typically removes from about 90 to 99% of the VOC's (e.g., NMP) remaining in the stream. In certain embodiments, the second VOC polishing concentrator 50' is identical to the first VOC polishing concentrator 50. The collected air stream may be condensed in the condenser 80 as shown.

A bypass line 85 may be provided to allow interruption of the concentrator units, the bypass line 85 directing the flow (e.g., with the aid of fan 88) to one or more back-up carbon filters 87, for example, so that the content of the VOC's exhausted to atmosphere does not exceed regulatory limits (e.g., <1 mg/Nm$^3$).

An emergency purge system 90 is provided, which includes purge line 91 having a damper 92 that directs the flow of gas from the condenser 10 to one or more emission control units, such as one or more carbon filters 95.

FIG. 8, where like numerals indicate like parts to those described above, illustrates a similar process with only a single VOC polishing concentrator 50 being employed. In this embodiment, two carbon filters 87, 87' are arranged downstream of the single VOC polishing concentrator 50 in order to achieve the target VOC emission concentration of <1 mg/Nm³. This embodiment also eliminates the emergency purge system 90, instead a purge fan 790 is fluidly connected to the exhaust line 72 as shown to provide an emergency purge.

As in the case of coil condensers 10, avoidance of fog formation in direct contact condensers 910 depends on gradual cooling of the solvent-laden air stream in the condensing region, that is within the height of packing 915. Cooling rate is first considered in the design selection of the volume of packing section 915. Condenser vessel 905 is preferably circular in cross-section. Alternatively, it may be of square or rectangular cross-section in plan view in order to accommodate site layout requirements. Similar to the case of coil type condensers, the volume is determined on a superficial volume basis. That is, the volume space occupied by the packing within the overall dimensions of the packing region 915 is ignored in calculating the superficial residence time. The specific volumetric airflow Q through the coil is expressed in normal cubic meters per unit time. The packing face area and depth in the flow direction are used to calculate the volume V in cubic meters. Therefore, the superficial residence time in the core is determined as t=V/Q. Further, the temperature drop DT in Centigrade degrees (note this parameter is a temperature difference value, not an absolute temperature value) of the air and solvent driven by the cooling coil may be measured directly in operation or calculated from supplier sizing data in the design phase. Finally, the rate of cooling R may be expressed as R=DT/t. For example, a direct-contact condenser vessel has a face area of 4.0 square meters and a packing height of 1.5 meters. The specific volumetric airflow is 25,000 Nm³/h. Therefore, the residence time may be calculated as t=(4.0×1.5) m³/25,000 m³/hr=2.4×10⁻⁴ hr. Converting to milliseconds t=2.4×10⁻⁴ hr×3,600,000 millisec/hr=864 milliseconds. If the air temperature entering the packing is 83° C. and the exiting temperature is −4° C. the cooling rate R=DT/t=(83° C.−(−4) ° C.)/864=0.1° C. per millisecond.

For NMP capture with minimal fog formation in the condensing packing regions where condensation of solvent is occurring while the gas flow travels the distance within the packing, the rate of cooling should be less than 0.20° C. per millisecond, preferably between 0.07 and 0.15° C. per millisecond. Typical design criteria for organic solvents such as DMAc with water vapor for minimal fog formation in the condensing coil regions where condensation of solvent is occurring while the gas flow travels the distance within the packing the rate of cooling should be less than 0.15° C. per millisecond, preferably between 0.05 and 0.12° C. per millisecond. In most cases the acceptable maximum cooling rates for a particular solvent must be determined by experiment.

In operation the method of precise control of the cooling rate may be illustrated in reference to FIG. 9 for exemplary case of packing 915. The flow meter 924 and temperature sensor 921 monitor flow rate and temperature of the cooled solvent medium entering the manifold 913. The circulating flow 939 is driven by a fluid pump 992 in communication with the fluid entry connection of the cooling coil 991. Further, the temperature of the air entering the packing 915 is preferably measured with an array of one or more temperature sensors 922 spaced across the cross-section of the entry face of packing, and the temperature of the air exiting the demister 928 is preferably measured with an array of one or more temperature sensors 923 spaced across the cross-section of the exit face of the demister. Said air temperature sensors may be RTDs or thermocouples. The temperature of the entering cooled solvent media is measured and controlled to a pre-determined set point by a suitable sensor and PID controller 921 in control communication with a valve and actuator positioned in the conduit 920 from the chilled brine source, typically a water-cooled or air-cooled centrifugal chiller. The measured air temperature drop of the air 922 entering the packing and the air 971 exiting the condensing tower is controlled to a pre-determined set point by a second suitable PID controller 923 in control communication with the variable frequency motor control driving pump 992. In this manner the target rate of temperature drop in the condensing unit 910 is controlled to 0.15° C. per millisecond for NMP for example.

Figure 10:
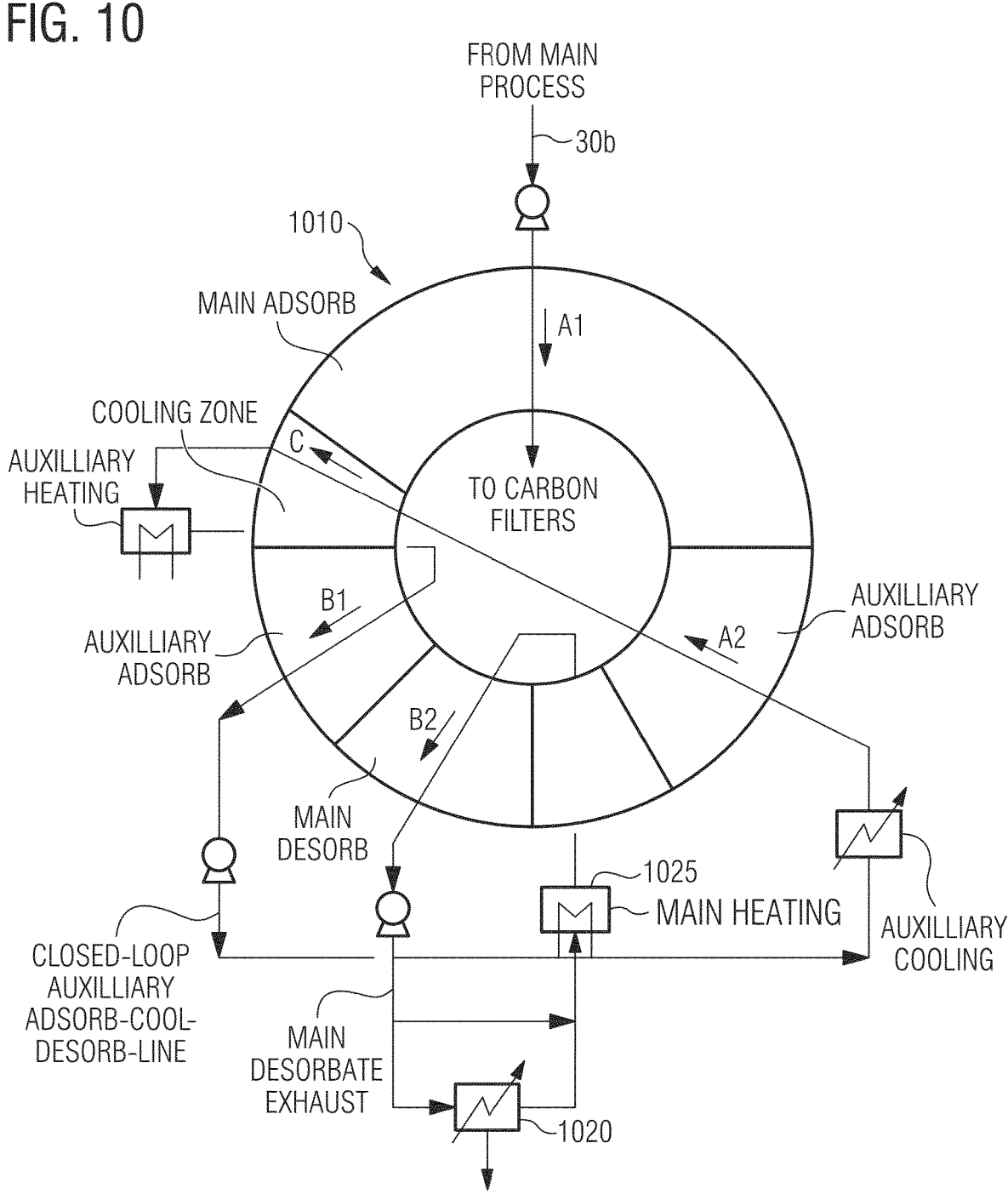
FIG. 10 illustrates an embodiment of a multi-stage adsorption/desorption unit.

FIG. 10 illustrates a different type of adsorption device to replace the single VOC polishing concentrator in FIG. 4. The main adsorption takes place on the path A1 through the first segment of a carousel-type adsorption concentrator 1010. The desorption is done with reference to JP2011031159A. A main desorption cycle is performed by the path B2 with a condenser 1020 and a heating coil 1025 implemented. Additionally, the FIG. 10 shows a closed-loop auxiliary adsorption-cooling-desorption circle with the path '"A2" (adsorption)-"C" (cooling)-heating-"B1" (desorbing)-cooling'. This configuration has the advantage that the two circles can be operated under inert conditions (if necessary) and can lead higher desorption concentrations in the main desorption circle. As described in FIG. 4 additional carbon filter can be implemented before the gas is released to the stack. The descripted process is also possible with a disc-type concentrator.

The foregoing description of the exhaust gas purification systems illustrated in FIGS. 5 to 10 focused on the details of the exhaust gas purification performed by the exhaust gas purification systems. The following description will focus on the monitoring of the exhaust gas purification systems illustrated in FIGS. 5 to 10.

As can be seen from FIGS. 5 to 10, different parts (sub-systems) of the illustrated exhaust gas purification systems are equipped with sensors 41, . . . , 48 and 61, . . . , 69. The sensors 41, . . . , 48 and 61, . . . , 69 are configured to measure various physical quantities at the exhaust gas purification systems such as temperatures, flow rates, mass flows, concentrations, numbers of particles, fill levels, pressures, pressure differences, energy consumptions, vibrations, etc. It is to be noted that the sensors illustrated in FIGS. 5 to 10 are chosen merely as examples and for illustration purposes. According to embodiments, also more, less or differently placed sensors may be used.

The sensors 41, . . . , 48 and 61, . . . , 69 are communicatively coupled to a communication interface 113 for coupling the respective exhaust gas purification system to a data cloud 120. The measurement data of the sensors 41, . . . , 48 and 61, . . . , 69 are sent (wirelessly or wired) as system data of the respective exhaust gas purification system to the data cloud 120 by the communication interface 113.

The data cloud 120 stores the system data, so that the system data can be accessed locally and at any time. The system data are analyzed either locally at a terminal device 130 of a user or in the data cloud 120 such that the user may retrieve the analysis results via the terminal device 130 from the data cloud. The analysis of the system data allows to determine one or more characterizing quantities of the exhaust gas purification system that enable monitoring of the respective exhaust gas purification system.

In the following, some exemplary characterizing quantities of the exhaust gas purification systems will be described in detail.

For example, the sensors 44, 46, 47 and 68 may be used determine a concentration of purified gas and an amount of desorbant/condensate at a concentration wheel of the adsorptive concentrator 50 as a function of the temperature of the exhaust gas stream entering the adsorptive concentrator 50 via the line 30*a*, a concentration of VOCs of the exhaust gas stream entering the adsorptive concentrator 50 via the line 30*a* and/or a rotation speed of the concentration wheel (indicating the concentration ratio). For example, the sensor 68 may be used to measure the concentration of VOCs of the exhaust gas stream entering the adsorptive concentrator 50 via the line 30*a* as well as the temperature of the exhaust gas stream. The sensors 44 and 46 may be used to measure the concentration of purified gas after the adsorptive concentrator 50 and the pollution control stages 52. The sensor 47 may be used to measure the concentration of VOCs in the desorbant flowing from the adsorptive concentrator 50 to the desorbant condenser 80. The rotation speed of the concentration wheel may be measured using another sensor (not illustrated) or be read from the operation parameters of the exhaust gas purification system. The measurement data of the sensors 44, 46, 47 and 68 are transmitted to the data cloud 120 as part of the system data such that the above characterizing quantity of the exhaust gas purification system may determined in the data cloud 120 or at the terminal device 130 of the user based on the system data stored in the data cloud 120.

The sensors 66, 67 and 69 may, e.g., allow to determine an amount of solvent recovered from the exhaust gas stream as a function of one or more operating parameters of the exhaust gas purification system (such a recirculation rate of the exhaust gas stream to be purified, flow rates of gas streams, ejection of gas at the condenser 10 via the conduit 30, temperatures in certain stages of the exhaust gas purification system, etc.). For example, the sensor 66 may measure a fill level of the recovered condensate (solvent) in the container 38. Similarly, the sensor 69 may measure the flow rate of recovered condensate (solvent) from the condenser 80 into the line 81. The sensor 67 is illustrated as an example of a sensor for measuring one of the operating parameters of the exhaust gas purification system. For example, the sensor 67 may measure the amount of gas ejected at the condenser 10 via the conduit 30. It is to be noted that other or more sensors than the sensor 67 may be used to determine the amount of solvent recovered from the exhaust gas stream as a function of one or more additional or different operating parameters of the exhaust gas purification system. Similarly, the amount of recovered solvent may be determined based on measurement of data of other or additional sensors (e.g. a level sensor in the sump of the vessel 905 illustrated in FIG. 9).

The efficiency of filter 18 may, e.g., be determined as characterizing quantity of the exhaust gas purification system. For example, the filter efficiency may be determined based on the number of particles in the exhaust gas stream to be purified before and after the particle filter 18 (e.g. measured by sensors 60 and 62). In some examples, the filter efficiency of filter 18 may be determined as a function of one or more operating parameters of the exhaust gas purification system (such as a temperature of the exhaust gas stream to be purified, one or more temperatures measured at the condenser 10, a volume flow rate of the exhaust gas stream to be purified, a pressure difference, etc.).

Sensor 63 may, e.g., be a scatterometer, an ultrasonic anemometer or a laser diffraction spectrometer. The measurement data of sensor 63 may be analyzed in order to monitor fog formation in the condenser 10. The monitoring of the fog formation in the condenser 10 may allow to automatically (or manually) adjust the temperature gradient (s) used in the condenser 10 for cooling down the exhaust gas stream to be purified. For example, if fog formation is detected, an according message (information) may be sent back to the respective exhaust gas purification system or to a control system for the respective exhaust gas purification system such that the temperature gradient(s) for the condenser 10 may be dynamically adjusted based on the message.

The sensors 62 and 64 may, e.g., allow to determine a condensation rate of the solvent in the condenser 10 as a function of one or more operating parameters of the exhaust gas purification system. Similarly, the sensors 62 and 64 may allow to determine a pressure difference between the inlet and the outlet of the condenser 10 as a function of one or more operating parameters of the exhaust gas purification system. For example, the one or more operating parameters of the exhaust gas purification system may be a consumed electrical power, a flow rate of the incoming exhaust gas stream to be purified, temperature(s) of, e.g., the incoming exhaust gas stream or the condenser 10, etc. Monitoring these parameters may allow to detect/determine beneficial or favorable operating parameters for the exhaust gas purification system.

Similarly, the power consumption of one or more elements of the exhaust gas purification system (e.g. pumps or fans) may be monitored via dedicated sensors (not illustrated). Together with the above described measurement data of the sensors 66 and 69, the energy consumed by the exhaust gas purification system per unit mass of recovered solvent may be determined.

The solvent balance of the exhaust gas purification system for a predetermined period of time may be determined based on the measurement of mass and volume flows at the exhaust gas purification system. For example, mass and volume flows of the solvent into, out and within the exhaust gas purification system may be measured via the sensors 60, 61, 65, 41 and 48. Accordingly, the solvent input into the exhaust gas purification system and the solvent output in various manners by the exhaust gas purification system may be measured and balanced.

Therefore, the sensors 60, 61, 65, 41 and 48 measure solvent concentrations in the respective gas stream and/or for flow rates of the respective gas or fluid streams. Although not explicitly illustrated in FIGS. 5 to 10, mass and volume flows of the solvent in the production facility such as the dryer 700 in FIG. 7 may be additionally monitored and sent to the data cloud 120 such that this additional measurement data may be taken into account for the solvent balance.

Further, leakages in the adsorptive concentrator 50 and the pollution control stages 52 may be determined based on the measurement data of the sensors 42 and 45. For example, sensors 42 and 45 may measure flow rates and/or mass flow rates of the gas stream passing through the adsorptive concentrator 50 and the pollution control stages 52. Additionally or alternatively, the measurement data of the sensors 42, 44, 46, 48 and 68 may be used for determining leakages in the adsorptive concentrator 50 and the pollution control stages 52. For example, a mass or volume balance may be determined for one or each of the adsorptive concentrator 50 and the pollution control stages 52 based on the measurement data of some or all of the sensors in order to determine a leakage.

Similarly, the fill level of the container 38 as measured by the sensor 66 and the mass flow of solvent into the container 38 as measured by the sensor 65 may allow to determine leakage in the container 38 or the drain line 37.

In other examples, overstressing of a mechanical component of the respective exhaust gas purification system may be determined based on the measurement data of one or more sensors. For example, an imbalance of the concentrator wheel of the adsorptive concentrator 50 or wear of a mechanical component of the exhaust gas purification system may be determined based on the measurement data. Overstressing of a mechanical component of the respective exhaust gas purification system may, e.g., be based on measurement data of a vibration sensor or measurement data for the energy consumption (e.g. frequency variations of an inverter) of the component since overstressing typically causes characteristic vibration patterns or characteristic variations of inverters for electrical power.

The foregoing examples illustrate that the proposed monitoring technique enables an automated, efficient and targeted monitoring of the exhaust gas purification systems illustrated in FIGS. 5 to 10.

What is claimed is:

1. A system for monitoring the state of an exhaust gas purification system for purifying an exhaust gas stream to be purified of an industrial system or an industrial process, wherein the exhaust gas stream to be purified is circulation air laden with at least one condensable fluid, the system comprising:
   a data processing system comprising at least one processor, which is configured to:
      retrieve system data of the exhaust gas purification system from a data cloud, wherein the system data stored in the data cloud were at least partially received beforehand by the data cloud from the exhaust gas purification system, and
      wherein the system data relate to at least measurement data of at least one sensor of the exhaust gas purification system and/or data about at least one adjustable parameter of the exhaust gas purification system; and
      determine a quantity characterizing the exhaust gas purification system based on the retrieved system data, and
   an exhaust gas purification system comprising:
      a communication interface which is configured to send the system data generated in the exhaust gas purification system to the data cloud, and
      at least one main-condenser having a feed port and an exhaust port and at least one main condensation stage, the at least one main condensation stage comprising:
         a condensation chamber being accessible by or permeable for the circulation air; and
         a cooling coil at least partially arranged inside said condensation chamber and permeated by a cooling medium; and
         a circulation air feed line being connected to said feed port of the at least one main-condenser and being connectable to a source of circulation air laden with the at least one condensable fluid,
            wherein a circulation air exhaust line is connected to said exhaust port of the at least one main-condenser,
            wherein a side-stream off-gas extraction line is fluidly connected to at least said condensation chamber of the at least one main-condenser,
            wherein a volume flow of the circulation air streaming in said condensation chamber is split into a high volume re-circulation stream leaving the at least one main-condenser through the circulation air exhaust line and a low volume off-gas side stream, and
            wherein the high volume re-circulation stream is a purified exhaust gas stream.

2. The data processing system of claim 1, wherein the data processing system is part of the data cloud.

3. The system of claim 1, wherein the exhaust gas purification system further comprises:
   an inlet for feeding the exhaust gas stream to be purified into the exhaust gas purification system; and
   an outlet for releasing the purified exhaust gas stream by the exhaust gas purification system.

4. The system of claim 1, wherein the exhaust gas purification system further comprises at least a pre-condenser with at least one pre-condensation stage being placed in the circulation air stream upstream of the at least one main-condenser and comprising:
   a pre-condenser condensation chamber being accessible by or permeable for the circulation air; and
   a cooling coil at least partially arranged inside said pre-condenser condensation chamber and permeated by a pre-cooling medium,
   wherein the pre-cooling medium has a temperature higher than a main cooling medium temperature.

* * * * *